US006839727B2

(12) United States Patent
Kechriotis

(10) Patent No.: US 6,839,727 B2
(45) Date of Patent: Jan. 4, 2005

(54) SYSTEM AND METHOD FOR COMPUTING A DISCRETE TRANSFORM

(75) Inventor: George Kechriotis, Arlington, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 651 days.

(21) Appl. No.: 09/847,168

(22) Filed: May 1, 2001

(65) Prior Publication Data

US 2002/0184279 A1 Dec. 5, 2002

(51) Int. Cl.$^7$ .......................... G06F 17/14; G06F 15/00
(52) U.S. Cl. ...................... 708/400; 708/402; 708/403
(58) Field of Search ................................ 708/400, 402, 708/403, 404, 405, 406, 407, 408, 409, 401

(56) References Cited

U.S. PATENT DOCUMENTS

| 5,349,549 | A | * | 9/1994 | Tsutsui ...................... 708/402 |
| 6,157,938 | A | * | 12/2000 | Wu et al. .................... 708/404 |
| 6,209,015 | B1 | * | 3/2001 | Jhung ......................... 708/402 |
| 6,304,887 | B1 | * | 10/2001 | Ju et al. ...................... 708/404 |

OTHER PUBLICATIONS

C.T. Chiu et al., "VLSI Implementation of Real–Time Parallel DCT/DST Lattice Structures for Video Communications," University of Maryland, Technical Report 92–34, 1992.

K.J.R. Liu et al., "Unified Parallel Lattice Structures for Time–Recursive Discrete Cosine/Sine/Hartley Transforms," University of Maryland, Technical Report TR 91–36, 1991.

Teresa Chang et al., "Experiments in Real–Time Decoding of Layered Video," Proc SPIE Integration Issues in Large Commercial Media Delivery Systems, 2615, Oct. 1995, p. 1–8.

\* cited by examiner

*Primary Examiner*—Dhuong Dinh Ngo
(74) *Attorney, Agent, or Firm*—Meyertons Hood Kivlin Kowert & Goetzel, P.C.; Jeffrey C. Hood; Mark S. Williams

(57) ABSTRACT

A system and method for parallel computation of Discrete Sine and Cosine Transforms. The computing system includes a plurality of interconnected processors and corresponding local memories. An input signal x is received, partitioned into P local vectors $x_i$, and distributed to the local memories. The preprocessors may calculate a set of coefficients for use in computing the transform. The processors perform a preprocess in parallel on the input signal x to generate an intermediate vector y. The processors then perform a Fast Fourier Transform in parallel on the intermediate vector y, generating a second intermediate vector a. Finally, the processors perform a post-process on the second intermediate vector a, generating a result vector v, the Discrete Transform of signal x. In one embodiment, the method generates the Discrete Sine Transform of the input signal x. In another embodiment, the method generates the Discrete Cosine Transform of the input signal x.

62 Claims, 10 Drawing Sheets

SYSTEM AND METHOD FOR COMPUTING A DISCRETE TRANSFORM

FIELD OF THE INVENTION

The present invention relates to the field of digital signal processing, and more particularly, to parallel computation of Discrete Sine and Cosine Transforms.

DESCRIPTION OF THE RELATED ART

A great variety of systems may be characterized by the property that they receive a signal and perform one or more mathematical operations on the received signal. Such signal processing is common in diverse fields such as telecommunications, wireless telecommunications, data compression, filtering, data analysis, and others. Examples of such mathematical operations include the Fourier transform, the Walsh transform, the Discrete Sine Transform, and the Discrete Cosine Transform, among others.

Mathematical operations such as these are typically performed on a received signal by a computer system with a single processor and memory (Von Neumann architecture). While this approach works well for small data sets (signals), the processing of much larger data sets may not be feasible due to time constraints.

To address the problems of processing large signals or data sets, algorithms have been developed for performing various signal processing operations via parallel computation systems, such as the Discrete Fourier Transform, for example. While a number of efficient methods for computation of the Discrete Sine and Cosine Transforms on a single CPU have been proposed, there are currently no known methods for parallel computation of the Discrete Sine and Cosine Transforms.

Thus, there exists a substantial need for a system and method for parallel computation of the Discrete Sine and Cosine Transforms.

SUMMARY OF THE INVENTION

Various embodiments of a system and method are presented for parallel computation of the Discrete Sine and Cosine Transforms for an input signal x. In one embodiment, the method is performed by a computing system which includes a plurality of P interconnected processors, each with a corresponding local memory. In one embodiment, the input signal x comprises N elements. The computing system may also include an input for receiving the signal x.

Each of the P interconnected processors may execute a preprocess in parallel on the received signal x to produce a first intermediate vector y, execute a Fourier Transform on the first intermediate vector to produce a second intermediate vector a, and execute a post-process in parallel on the second intermediate vector a to produce a result vector v, where the result vector v comprises the Discrete Transform of the input signal x, and where the Discrete Transform of the input signal x is useable in analyzing the input signal In one embodiment, the P interconnected processors may also store the Discrete Transform of the signal x after the executing the post-process. In one embodiment, the P interconnected processors may also partition the signal x is into P ordered local vectors, and distribute one of the P ordered local vectors respectively to each of the P memory mediums before the executing the preprocess.

In one embodiment, the Discrete Transform may be a Discrete Sine Transform, and executing the preprocess may include each processor receiving a first sub-vector of the local vector of a first mirror processor of the P processors, receiving a first element of the local vector of a second mirror processor of the P processors, and computing a first resultant local vector from the local vector of the first processor, the first sub-vector, and the first element. In one embodiment, where the first processor is the $i^{th}$ processor of the P processors, the first mirror processor is the $(P-1-i)^{th}$ processor of the P processors, and the second mirror processor is the $(P-i)^{th}$ processor of the P processors. It should be noted that each processor of the P processors has corresponding mirror processors, also of the P processors, and so each processor exchanges data with its corresponding mirror processor(s). In one embodiment, the initial processor of the P processors must be treated as a special case, wherein, instead of receiving a first element from the second mirror processor, the initial processor simply sets the first element of the first resultant local vector to zero.

In one embodiment, the system may also compute a set of coefficients which may be used to compute the transform. In various embodiments, the coefficients may be calculated offline before the signal x is received, or in realtime as part of the transform calculation.

In one embodiment, in computing the Discrete Sine Transform, the system may % Li execute a post-process on the second intermediate vector a. The second intermediate vector a may comprise P local vectors corresponding respectively to the P processors, where each the local vector includes real values and imaginary values. In executing the post-process on vector a, each of the P processors may compute a respective sequence of partial sums of the real values from the corresponding local vector. The P processors may then perform a scan add of the last partial sum of each of the sequences to produce a respective adjustment value for each sequence. Then, each of the P processors may add the respective adjustment value to each partial sum of the respective sequence to generate a respective adjusted sequence of partial sums, and generate a respective local resultant vector from the imaginary values of the corresponding local vector and the respective adjusted sequence of partial sums. The respective local resultant vectors may collectively form the resultant vector v.

In one embodiment, the Discrete Transform is a Discrete Cosine Transform, and executing the preprocess may include each processor $i_p$ of the P processors with index less than P/2 receiving even-indexed elements from the respective local vectors of processor $2i_p$ and processor $2i_p+1$, and storing the even-indexed elements in a second buffer corresponding to the processor $i_p$. Furthermore, the preprocess may include each processor $i_p$ of the P processors with index greater than or equal to P/2 receiving odd-indexed elements from processor $2(P-1-i_p)$ and processor $2(P-1-i_p)+1$, and storing the odd-indexed elements in the second buffer corresponding to processor $i_p$, where a union of respective contents of the second buffers comprises the intermediate vector y. In one embodiment, each processor may overwrite the corresponding local vector with contents of the corresponding second buffer.

In one embodiment, in computing the Discrete Cosine Transform, the system may execute a post-process on the second intermediate vector a. The second intermediate vector a may comprise P local vectors corresponding respectively to the P processors, where each the local vectors comprises a set of complex values. In executing the post-process on vector a, each of the P processors may perform an element-wise multiplication of the corresponding local vector and a corresponding coefficient vector to generate a corresponding first local resultant vector, and perform an even/odd shuffling operation on the corresponding first local resultant vectors to generate corresponding second local resultant vectors. In executing the post-process on vector a, a subset of the P processors may also perform a forward cyclic shift on the sequence of elements comprised in their collective second local resultant vectors. In one embodiment, the subset of the P processors comprises processors with indices greater than or equal to P/2. The respective second local resultant vectors of the P processors collectively form the result vector v, the Discrete Cosine Transform of the signal x.

In one embodiment, the even/odd shuffling operation performed on the corresponding first local resultant vectors may include each processor $i_p$ of the P processors with index less than P/2 receiving even-indexed elements from the respective first local resultant vectors of processor $2i_p$ and processor $2i_p+1$, and storing the even-indexed elements in a second buffer corresponding to processor $i_p$, and each processor $i_p$ of the P processors with index greater than or equal to P/2 receiving odd-indexed elements from the respective first local resultant vectors of processor $2(P-1-i_p)$ and processor $2(P-1-i_p)+1$, and storing the odd-indexed elements in the second buffer corresponding to processor $i_p$, where the respective contents of the second buffers comprise the corresponding second local resultant vectors. In one embodiment, each processor may overwrite the corresponding local vector with contents of the corresponding second buffer.

BRIEF DESCRIPTION OF THE DRAWINGS

A better understanding of the present invention can be obtained when the following detailed description is considered in conjunction with the following drawings, in which.

Figure 1:
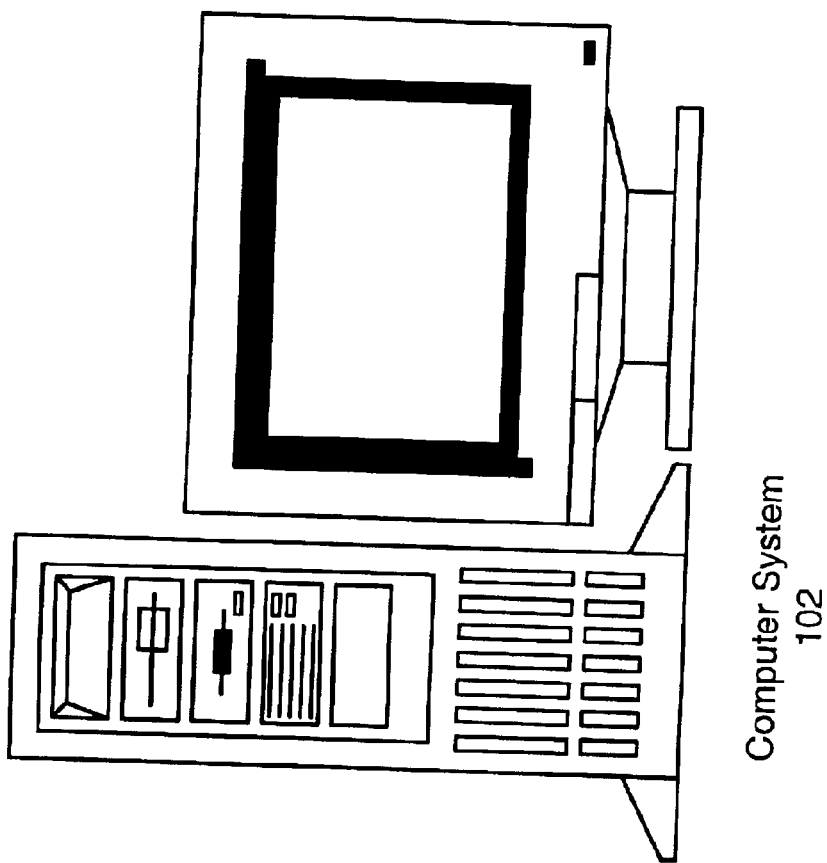
FIG. 1 illustrates a computer system, according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Incorporation by Reference

U.S. patent application Ser. No. 09/337,587, titled "Parallel System and Method for Performing Fast Fourier Transform", whose inventor is George Kechriotis, and which was filed on Jun. 21, 1999, now U.S. Pat. No. 6,532,484, is hereby incorporated by reference in its entirety as though fully and completely set forth herein.

FIG. 1—Computer System

FIG. 1 illustrates a computer system 102 which may be suitable for performing one embodiment of the invention. The computer system 102 may store and/or execute one or more software programs which perform the method described in FIGS. 4 and 7 below. In one embodiment, the computer system 102 may include two or more processors or CPUs, a display device, such as a monitor, as well as a chassis and one or more I/O devices, such as a keyboard and/or mouse. In another embodiment, the computer system 102 may also include two or more memory mediums corresponding to the two or more processors. In one embodiment, the computer system 102 includes a plurality of processors, e.g., 2, 4, 8, or a higher power of 2, processors.

The computer system 102 may take any of various forms, such as a personal computer, a workstation, e.g., a Sun™ workstation, available from Sun Microsystems, or any type of device which includes one or more processors that execute instructions from one or more memory mediums, or which includes programmable logic that has been configured to perform the methods described in FIGS. 4A–E and 5A–C. Exemplary computer systems include a personal computer, workstation, mainframe computer, a personal computing device (PDA), television, digital signal processing system, embedded device, and other systems. Thus, as used herein, the term computer system is intended to encompass any of various devices which include two or more processors that can execute instructions from one or more memory mediums and/or may include one or more programmable logic devices that can be configured to execute a method or algorithm, such as that described in FIGS. 4A–E and 5A–C.

The method of the present invention may be implemented in any of various types of devices and for any of various types of applications, such as described below with reference to FIGS. 2A–C.

Figure 2A:
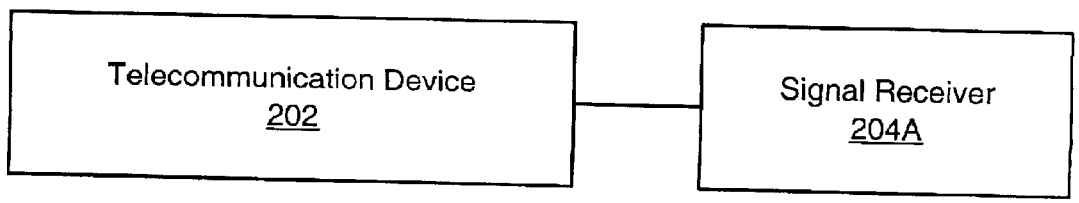
FIG. 2A is a diagram of a telecommunications system, according to one embodiment.
Figure 2B:
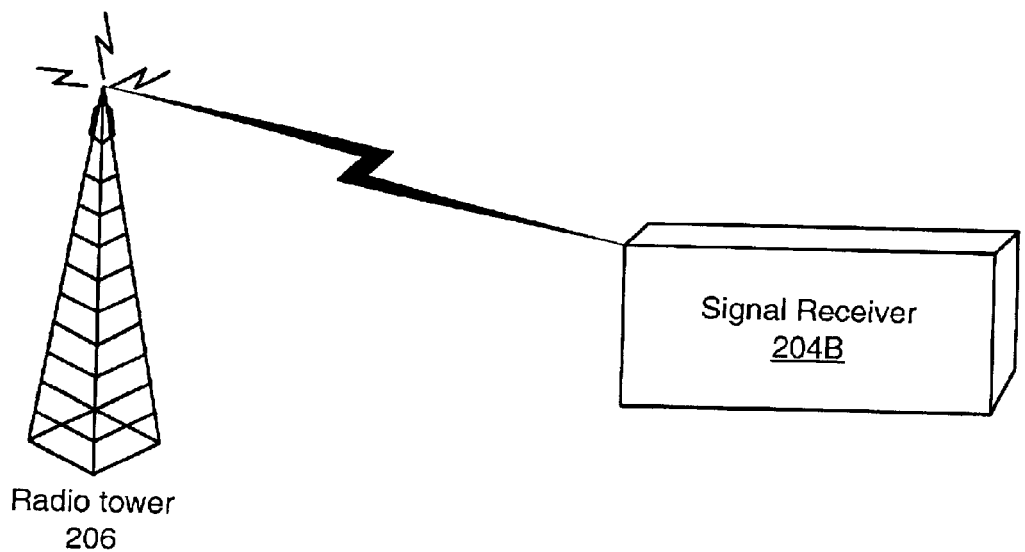
FIG. 2B is a diagram of a wireless telecommunications system, according to one embodiment.
Figure 2C:
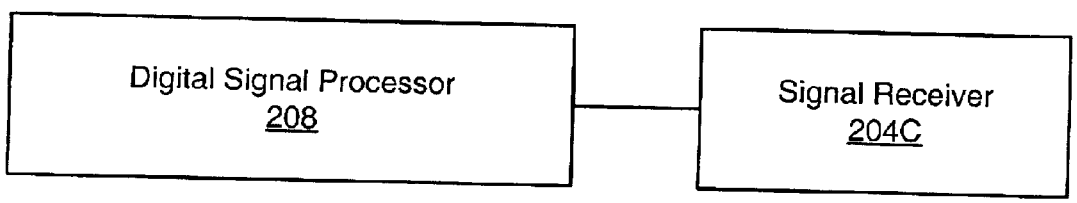
FIG. 2C is a diagram of a digital signal processing system, according to one embodiment.

FIGS. 2A–C—Applications Of The Discrete Sine and Cosine Transforms

FIGS. 2A, 2B, and 2C illustrate various exemplary applications where the invention may be used. However, it is noted that the invention is not limited to these applications, but rather may be used in any of various applications. As FIGS. 2A and 2B show, the Discrete Sine and Cosine Transforms may be useful in the fields of both wired and wireless telecommunications. As FIG. 2A shows, in a wired telecommunication system a signal receiver 204A may be coupled to a telecommunication device 202, and may be operable to receive telecommunication signals and transmit the received signals to the telecommunication device 202. Various filtering or processing operations may be performed by one or both of the signal receiver 204A and the telecommunication device 202. Similarly, in a wireless telecommunication system, as shown in FIG. 2B, a signal receiver 204B may be operable to receive signals from a radio tower 206, and to apply various filtering and/or signal processing algorithms to the received signals. In these example applications, a computer system 102 comprised in or coupled to the signal receiver 204 may compute the parallel Discrete Sine and/or Cosine Transforms described herein on the received signals to process the received signals and extract information from these signals or convert the signals to a different form for further processing. For example, the computer system 102 may perform the Discrete Sine and/or Cosine Transforms on the received signals to characterize the signals.

A broad area of application of the present invention is digital signal processing, as shown in FIG. 2C. As FIG. 2C illustrates, a signal receiver 204C may be coupled to a digital signal processor (DSP) 208, and may be operable to receive a signal and to transmit the received signal to the DSP for processing. Signal processing operations, such as the Discrete Sine and/or Cosine Transforms, may be performed on the received signal by one or both of the signal receiver 204C and the DSP 208. For example, the DSP 208 may perform the parallel Discrete Sine and/or Cosine Transforms described herein to extract information from the signal or convert the signal to a different form for further processing. Common applications for the Discrete Cosine Transform are JPEG and MPEG encoding, and data compression in general. Large 1D cosine transforms can be used as an alternative and perhaps more efficient way to compress a long 1D signal (e.g. sound, music). One application of the Discrete Sine Transform is for the solution of partial differential equations (PDE) used to simulate various physical phenomena, or to design structures with desired electromagnetic properties.

In addition to the applications listed above, the method described herein may also be used in instrumentation systems, industrial automation or process control systems, telecommunication systems, financial systems, machine vision systems and any other application where it is desirable to perform parallel Discrete Sine and/or Cosine Transforms on a received signal. More specific applications wherein the method of the present invention may be used include digital signal processing in a telecommunication system, as well as analysis related to image data, measurement data, acoustic data, seismic data, financial data, stock data, futures data, business data, scientific data, medical data, insurance data, musical data, biometric data, and telecommunications signals, among others.

As mentioned above, the Discrete Sine and/or Cosine Transforms may be performed on relatively small data sets or signals via conventional computation techniques, i.e., via a standard Von Neumann machine, with relative ease. However, especially in many applications, input signals may comprise millions, or even billions, of values, thus rendering the task of performing the Discrete Sine and/or Cosine Transform on the signal intractable, or at least unfeasible, for a Von Neumann (single processor) machine. In these cases, a parallel computation system, such as that described below with reference to FIG. 3, may be used to implement various embodiments of the present invention.

Figure 3:
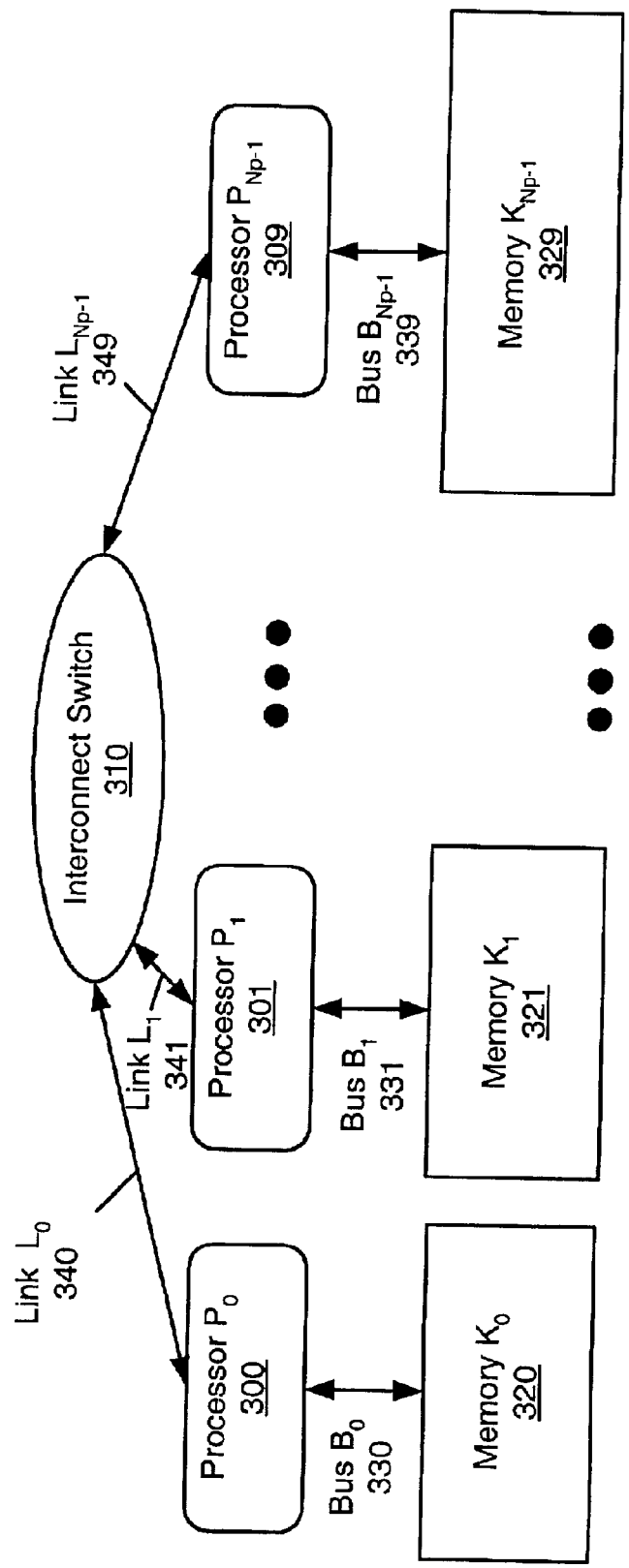
FIG. 3 illustrates a parallel computer system which may be suitable to perform a method according to one embodiment of the present invention.

FIG. 3—A Parallel Computing System

FIG. 3 is a diagram of a parallel computing system, according to one embodiment. As FIG. 3 shows, in one embodiment, a plurality of processors, $P_0$ 300, $P_1$ 301, ..., $P_{Np-1}$ 309 are respectively coupled to each of a corresponding plurality of local memory mediums $K_0$ 320, $K_1$ 321, ..., $K_{Np-1}$ 329, via corresponding buses $B_0$ 330, $B_1$ 331, ..., $B_{Np-1}$ 339.

As FIG. 3 also shows, the processors $P_0$ 300, $P_1$ 301, ..., $P_{Np-1}$ 309 may be coupled to an interconnect switch 310 via corresponding links $L_0$ 340, $L_1$ 341, ..., $L_{Np-1}$ 349, thereby enabling each processor to communicate and exchange data with each of the other processors. In one embodiment, the parallel computing system may be comprised in a single unit, such as the computer system 102 described above with reference to FIG. 1, wherein the single unit includes two or more processors and corresponding local memory mediums. In another embodiment, the parallel computing system may comprise two or more coupled computers, wherein each computer includes one or more processors and corresponding local memory mediums, and wherein each computer is directly coupled to each of the other computers. In yet another embodiment, the parallel computing system may comprise a plurality of computers coupled over a network, such as the Internet, wherein each computer includes one or more processors and corresponding local memory mediums.

Thus, the present invention may be implemented in various computer systems, including multi-processor computers and networked computers, including both LAN and WAN distributed computing systems.

Discrete Sine Transform:

The Discrete Sine Transform (DST), expands a sequence of real numbers into component sine functions. Given a real (single or double precision) sequence $x_k$, k=0, ..., N-1, the forward DST is defined as:

$$X_k = \sum_{j=0}^{N-1} x_j \sin((\pi jk)/N), k = 0, \ldots, N-1 \qquad (1)$$

Note from Eq. (1), that since sin (0)=0, the value of the first element $x_0$ does not affect the result of the expansion. Thus two sequences that differ only in the value of their first element result in the same sin expansion.

The inverse DST has the same form as the forward DST:

$$x_k = \sum_{j=0}^{N-1} X_j \sin((\pi jk)/N), k = 0, \ldots, N-1 \qquad (2)$$

A forward DST, being followed by an inverse DST, results in scaling the elements of the original sequence $x_k$, k=1, ..., N-1 by N/2. Note, that only the elements $x_k$, k=1, ..., N-1 are being reconstructed, while x, becomes equal to zero in the reconstruction procedure.

The parallel 1D DST computation is based on the parallel 1D real-to-complex FFT computation. The DST can be obtained via the real-to-complex FFT by suitable pre- and post-processing. A method to efficiently perform this pre-processing and post-processing in parallel is described below with reference to FIGS. 4A–C.

Figure 4A:
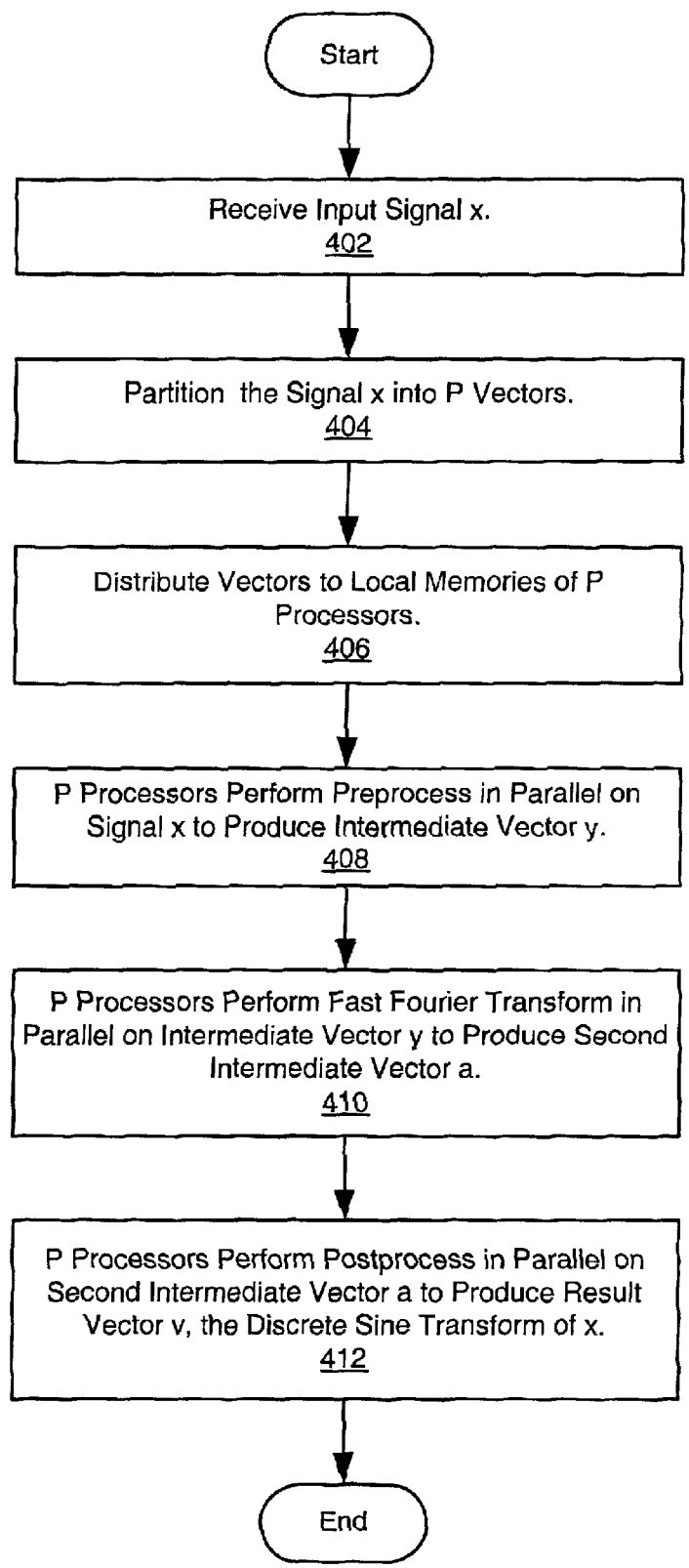
FIG. 4A is a flowchart of one embodiment of a method for parallel computation of a Discrete Sine Transform.

FIG. 4A—Flowchart of Parallel Discrete Sine Transform

FIG. 4A is a flowchart of a method for parallel computation of the Discrete Sine Transform. In one embodiment, the method is performed on a parallel computation system comprising P processors and P corresponding local memories, as described above with reference to FIG. 3. It should be noted that in various embodiments, one or more of the following steps may be performed in a different order than shown, or omitted.

As FIG. 4 shows, in 402, an input signal x may be received. In one embodiment, the input signal x comprises N elements, where N is divisible by $4P^2$. Note that when a signal has been digitized, the terms "signal" and "vector" may be used interchangeably.

In 404, the signal x may be partitioned into local vectors, and in 406, distributed to the local memories of the P processors, forming a distributed vector x. In one embodiment, each local vector comprises N/P elements.

In 408, the P processors may perform a preprocess in parallel on the signal x to generate an intermediate vector y. In one embodiment, the P processors may collectively perform the preprocess on the signal x to prepare the data for application of a Fast Fourier Transform (FFT). Further details of the preprocess are provided below with reference to FIG. 4B.

In one embodiment, a set of coefficients $w_i$ may be calculated in parallel according to the equation:

$w_{ig} = \sin(i\pi/N)$, $i = 0, \ldots, N-1$ where ig is the global index of each element of the signal x. In one embodiment, each processor of the P processors may allocate a local buffer of length N/P, and calculate corresponding local values for w by performing the following local calculation:

$$w_{il}^{ip} = \sin((il + ipN/P)\pi/N), i=0, \ldots, N/P-1$$

where il is the local index of each element of the local vector, and $i_p$ is the processor index, ranging from 0 to P−1. The calculated coefficients may be used to perform the above mentioned preprocess on the signal x. In one embodiment, the calculated coefficients may be FFT twiddle factors. In one embodiment, the coefficients may be calculated before the signal x is received in 402. In other embodiments, the coefficients may be calculated just prior to, or during, the preprocess.

In 410, the P processors may perform a Fast Fourier Transform in parallel on the intermediate vector y to produce a second intermediate vector a. In one embodiment, the second intermediate vector a may comprise alternating real and imaginary components.

In 412, the P processors may perform a post-process in parallel on the second intermediate vector a to produce a result vector v, which is the Discrete Sine Transform of the signal x. The Discrete Sine Transform of the signal x may be useable in analyzing the signal x. In one embodiment, the Discrete Sine Transform of the signal x may be stored after execution of the post-process. Further details of the post-process are described below with reference to FIG. 4C.

Figure 4B:
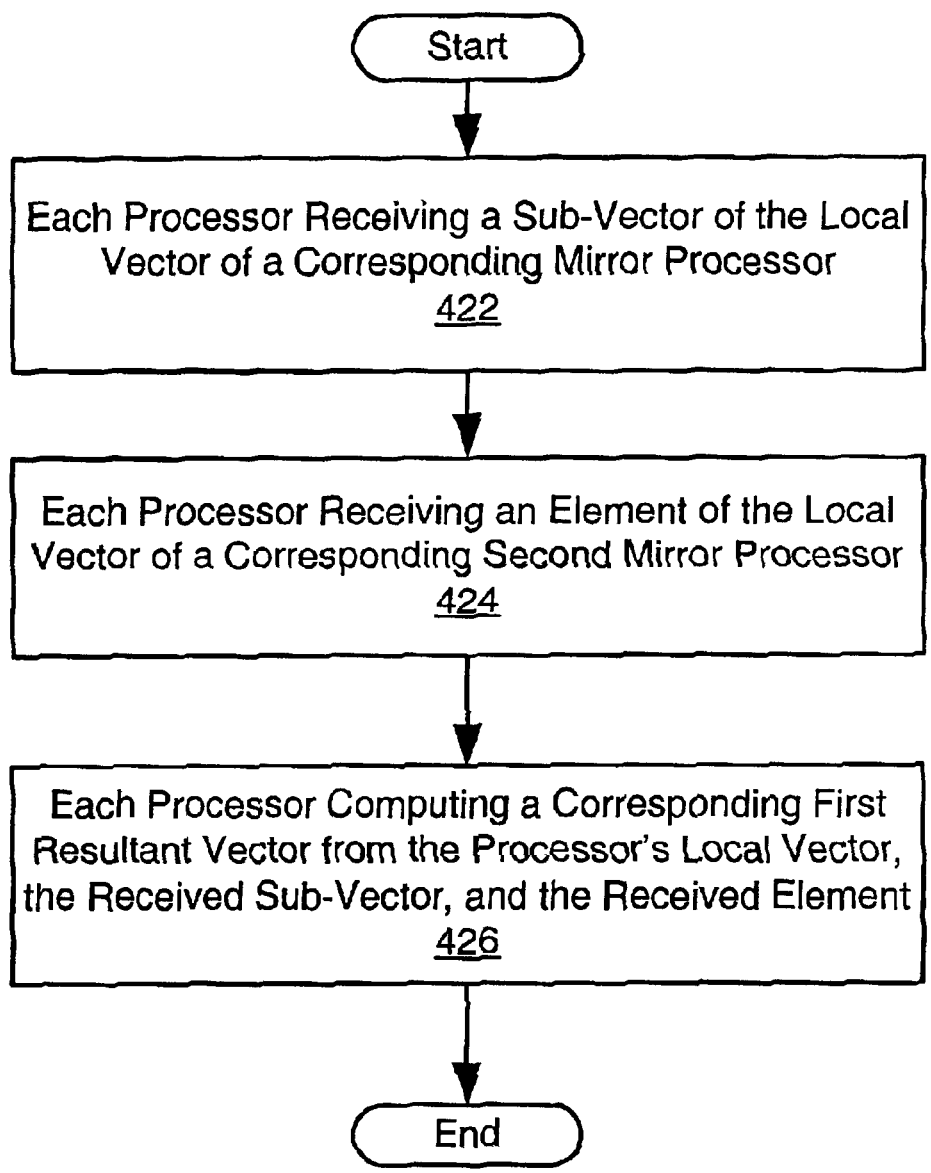
FIG. 4B is a flowchart of one embodiment of a preprocess in the method of FIG. 4A.

FIG. 4B—Flowchart of the Discrete Sine Transform Preprocess

FIG. 4B is a flowchart of one embodiment of the preprocess of 408 above. As mentioned above, the preprocess operates on the received signal x to produce the first intermediate vector y, described below.

Figure 5A:
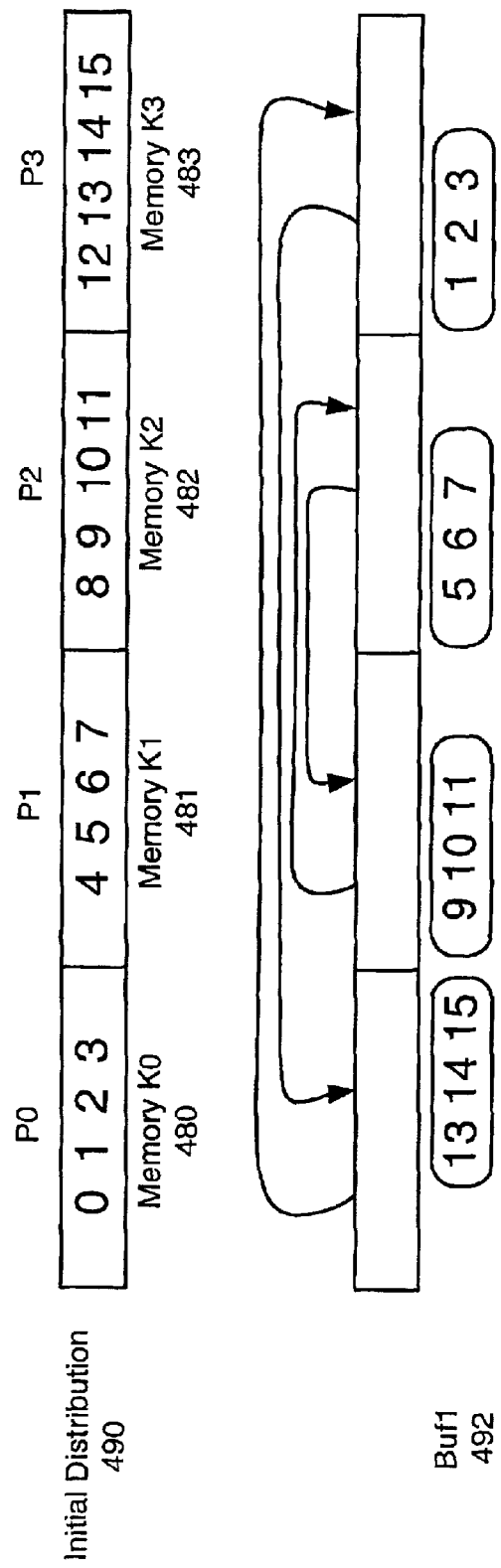
FIG. 5A is a block diagram illustrating the movement of data in the preprocess of FIG. 4B.

In one embodiment, every processor may determine the global indices of the local part of the signal x (i.e., the distributed vector x) that it owns: For example, each processor $i_p$ has in its local memory N/P elements, indexed (locally) from 0 to N/P−1, corresponding to a contiguous part of the distributed vector x, whose (global) indices range from $i_p$ (N/P) to $(i_p+1)(N/P)-1$. One embodiment of this initial data distribution is shown in FIG. 5A, where it is assumed for illustration purposes that N=16 and P=4.

In one embodiment, the preprocess may perform the following calculation in parallel:

$y_0 = 0$ $y_{ig} = \sin((i_g\pi)/N) \ (x_{ig} + x_{N-ig}) + (\tfrac{1}{2})(x_{ig} - x_{N-ig})$, $ig = 1, \ldots, N-1$ \hfill (3)

where $i_g$ is the global index of each element of vector y. In one embodiment, every processor $i_p$ has the same amount of local data $n_b$, where $n_b = N/P$. The method in which this calculation may be performed in parallel follows.

As FIG. 4B shows, in 422, each processor of the P processors may receive a sub-vector of the local vector of a corresponding mirror processor. In one embodiment, the sub-vector comprises all but the first element of the mirror processor's local vector. In one embodiment, each processor iv has corresponding mirror processor P−$i_p$−1. Thus, for example, processor 1 has mirror processor P−2. Conversely, processor P−2 has mirror processor 1. Therefore, each processor exchanges data with its mirror processor.

Said another way, every processor may copy $n_b-1 = N/P-1$ elements, starting from the element with local index 1 (i.e. all local elements except the first one) into a buffer $buf_0$. During the same operation, each processor may also determine its mirror processor as the processor whose index is P−$i_p$−1. A second buffer $buf_1$ of the same length as $buf_0$ may be allocated by every processor to store data received from its mirror processor.

Every processor may send its $buf_0$ buffer to the its mirror processor and receive data from its mirror processor, copying the received data into $buf_1$. To avoid deadlocks during this operation, for every pair of processors, the processor with the highest index may send first then receive data, while the processor with the lowest index may receive data, then send data. The data located in $buf_1$ of every processor at the end of this operation is shown in FIG. 5A (492).

In 424, each processor $i_p$ of the P processors may receive an element of the local vector of a corresponding second mirror processor. In one embodiment, the second mirror processor for processor $i_p$ has index P−$i_p$. In other words, the second mirror processor may be the processor just subsequent to the mirror processor of 422.

Figure 5B:
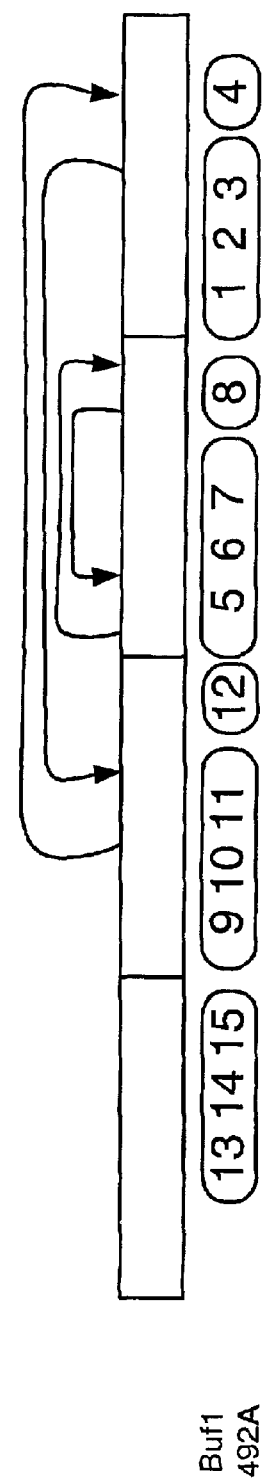
FIG. 5B is a block diagram illustrating the movement of data in the preprocess of FIG. 4B.

In one embodiment, every processor except processor 0 determines its offset-1 mirror as the processor whose index is P−$i_p$, and sends its first local element to this processor, while receiving one element from its second mirror processor. Again, as in the previous operation, the same deadlock avoidance scheme is employed. The data owned by each processor at the end of this stage is shown in FIG. 5B, (492A). Thus, in one embodiment, the zeroeth processor (index $i_p$=0) may be treated as a special case, because there is no subsequent processor to its mirror processor P−1.

Thus, as indicated in 422 and 424 above, in one embodiment, each processor sends $n_b$−1 elements of its local vector to its mirror processor P−$i_p$ −1, then sends the first element of the local vector to processor P−$i_p$.

As FIG. 4B indicates, in 426, each processor may compute a corresponding first resultant vector $y_{i_p}$ from the processor's local vector, the received sub-vector (of 422 above), and the received element (of 424 above).

As mentioned above, the initial processor (processor 0) may be treated as a special case in that there is no received element. In this case, the first element of the resultant vector is simply set to zero, as shown above in equation (3). More specifically, processor 0 sets its first local element y(0) to zero, and computes the values of the remaining $n_b$−1 local elements as:

$y(i_1) = w(i_1)\cdot(x(i_1) + buf_1(n_b-i_1-1)) + 0.5\cdot(x(i_1) - buf_1(n_b-i_1-1))$,
$i_1 = 1, \ldots, n_b-1$ Here $w(i_1)$ is the local DST to real FFT twiddle factor, as described above. The remaining processors each compute the first local element as $y(0) = w(0)\cdot(x(0) + e) + 0.5\ (x(0) - e)$ (Here e is the value of the element that has been exchanged during the previous operation). Moreover, each of the remaining processors computes the remaining $n_b-1$ elements as:

$$y(i_1)=w(i_1)\cdot(x(i_1)+buf_1(n_b-i_1-1))+0.5\cdot(x(i_1)-buf_1(n_b-i_1-1)),$$
$$i_1=1,\ldots,n_b-1$$

Thus, in one embodiment, each processor may compute the respective first resultant local vector $y(i_p)$ by computing a resultant sub-vector from a sub-vector of the local vector of the processor and the received sub-vector, and computing a resultant element from a first element of the local vector of the processor and the received first element, where the first resultant local vector comprises the resultant element and the resultant sub-vector, in that order.

In one embodiment, each processor may compute a respective set of coefficients, and may then compute the respective first resultant local vector by calculating a plurality of resultant values, where each resultant value is computed by generating a sum and a difference of a respective element of the local vector of the processor and a complementary element of the received sub-vector, multiplying the sum by a corresponding one of said coefficients to generate a first product, multiplying the difference by a constant value to generate a second product, and adding the first product and second product to generate the resultant value.

In the special case of the initial processor $P_0$, the processor may receive a first sub-vector of the local vector of the corresponding mirror processor, and the processor may compute the first resultant local vector from the sub-vector of the processor's local vector, the received first sub-vector and a first element having a value of zero.

Figure 4C:
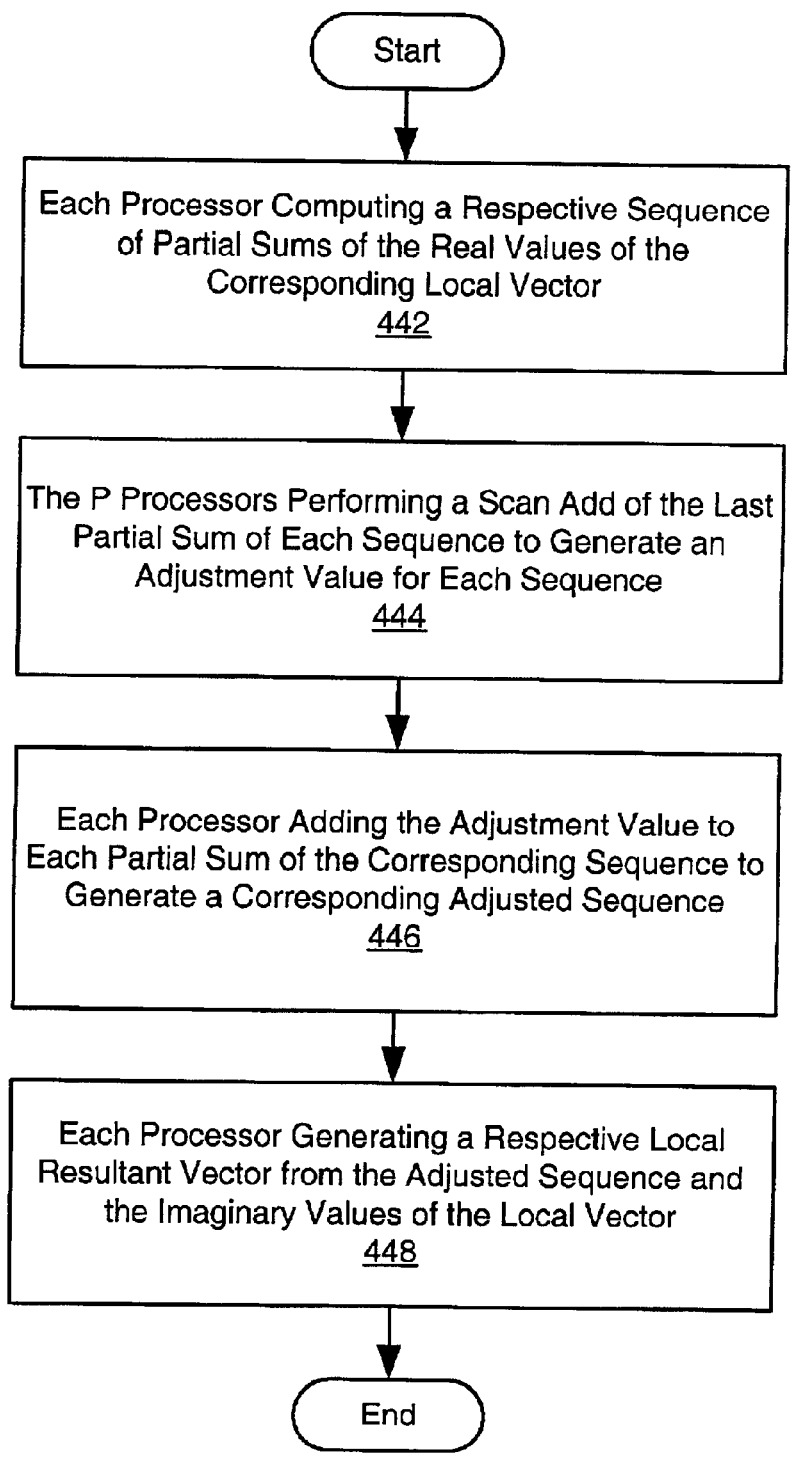
FIG. 4C is a flowchart of one embodiment of a post-process in the method of FIG. 4A.

The calculated first resultant vectors yip together form the first intermediate vector FIG. 4C-Flowchart of the Discrete Sine Transform Post-process After the computation of the parallel real-to-complex FFT (410 above), post-processing may be required to compute the DST, as indicated in 412 above. FIG. 4C is a flowchart of this post-processing operation. In one embodiment, the second intermediate vector a resulting from the FFT may have a particular format. For example, in one embodiment, the vector a may comprise successive pairs of imaginary and real values, where each pair comprises a complex number. Such a format is assumed for illustration purposes in the following description of the Discrete Sine Transform Post-process. It should also be noted that the term "local vector" now refers to the distributed portions of the intermediate a, resulting from the FFT performed above in 412.

As FIG. 4C shows, in 442, each processor may compute a respective sequence of partial sums of the real values of the corresponding local vector $a_{i_p}$. More specifically, if the real and imaginary parts of the FFT result are denoted as $R_k$ and $I_k$, the post processing may be summarized in the following operations:

$$F_{2k}=I_k$$

$$F_{2k+1}=F_{2k-1}+R_k, k=0,\ldots,N/2-1$$

i.e. the even terms are obtained directly from the imaginary part of the FFT result, while the odd terms require the evaluation of a recursive relation.

It is assumed that the result of the parallel real to complex FFT is stored in the local elements $a_{i1}$, i=0, ..., N/P-1 of each processor's local memory. Note that in this embodiment, while the result is complex, the values are stored as real numbers, i.e. every complex result value is stored as two consecutive real numbers a(j) and a(j+1).

Moreover, elements a(0) and a(1) in the local vector of the first processor contain the real parts of the complex FFT elements whose global indices are 0 and N/2 correspondingly (this is the format of the output of the parallel real-to-complex FFT routine in Sun. Microsystems SUN S3L, a library of parallel mathematical computations functions developed by Sun Microsystems, such as parallel FFTs, matrix manipulation functions, etc.). Thus, in this embodiment, the first two terms of the intermediate vector a are treated as a special case, as described below. It should be noted that in other embodiments of the present invention, other formats of the vector a may be utilized.

If, for example, there are P=4 processors and the length of the FFT output is N=32, the vector a will be distributed as follows (both the local and the global indices are shown)
[$a_0\ a_1\ a_2\ a_3\ a_4\ a_5\ a_6\ a_7$] [$a_0\ a_1\ a_2\ a_3\ a_4\ a_5\ a_6\ a_7$] [$a_0\ a_1\ a_2\ a_3\ a_4\ a_5\ a_6\ a_7$] [$a_0\ a_1\ a_2\ a_3\ a_4\ a_5\ a_6\ a_7$]
local indices:
[0 1 2 3 4 5 6 7] [0 1 2 3 4 5 6 7] [0 1 2 3 4 5 6 7] [0 1 2 3 4 5 6 7]
global indices:
[0 1 2 3 4 5 6 7] [8 9 10 11 12 13 14 15] [16 17 18 19 20 21 22 23] [24 25 26 27 28 29 30 31]

The steps performed by each processor $i_p$ during this operation (442) are described below:

1) Processor 0 evaluates its first and second local elements as:
a(0)=0.5 a(0)
a(1)=0.0

Note that the term a(0) refers to the zeroeth slot of the buffer or memory in which the vector a is stored.

2) In one embodiment, every processor allocates a local buffer b of size $n_b/2=N/(2P)$ and performs a partial scan of its local even-indexed elements, as illustrated in the following pseudo-code:
$s_0=0.0$
j=0
for $i_1=0, 2, 4, \ldots, n_b-1$
    $s_0=s_0+a(i_1)$
    $b_0=s_0$
    j=j+1
end for i.e., at the end of this stage, $b_0(0)$ is equal to zero, $b_0(1)$ is equal to a(2), $b_0(2)$ a(2)+a(4), $b_0(3)$=a(2)+a(4)+a(6), etc.

3) The last element of every local buffer b may be shifted towards the next highest indexed processor: Every processor is, determines the index of the next processor as $i_{next}=i_p+1$ and the index of the previous processor as $i_{previous}=i_p-1$. Each processor copies the element $b_0$ $(n_b/2-1)$ to a local variable $c_0$ and sends it to the next respective processor; each processor also receives an element from the previous respective processor, and stores the received element in a local variable $c_1$. To avoid deadlock situations during this operation, in one embodiment, odd indexed processors send first and then receive, while even indexed processors receive first, then send. Processor $P_0$ may set its local variable $c_1$ to zero, as a special case.

Consider for example the case P=4 (4 processors) and N=32. Then the length of the local buffer $b_0$ in every processor is N/(2P)=4. The element $c_0$ of each processor is sent to element $c_1$ of the next higher indexed processor, as shown below.
[$b_{00}\ b_{01}\ b_{02}\ b_{03}$] [$b_{00}\ b_{01}\ b_{02}\ b_{03}$] [$b_{00}\ b_{01}\ b_{02}\ b_{03}$] [$b_{00}\ b_{01}\ b_{02}\ b_{03}$]
$c_1=0\ c_0\text{-->}c_1\ c_0\text{->}c_1\ c_0\text{->}c_1$ In 444, the P processors may perform a scan-add operation across the processors to compute partial sums of all c, variables. In one embodiment, this operation may be performed by each processor receiving the last partial sum of the preceding processor. This operation may be repeated, resulting in a progressive accumulation of each processor's last partial sum. In one embodiment, this operation may be performed via the Sun Microsystems MPI_Scan message-passing primitive. If $c_1(i)$ is denoted by the value of the variable $c_1$ in processor i, at the end of this step the local variable $c_1(ip)$ in every processor ip contains the partial sum:

$$c_1(i_p) = \sum_{i=0}^{ip} c_1(i)$$

i.e in the previous example, $c_1(0)=c_1(0)$, $c_1(1)=c_1(0)+c_1(1)$, $c_1(2)=c_1(0)+c_1(1)+c_1(2)$, etc.
where $c_1(i_p)$ comprises an adjustment value for each processor $i_p$.

In 446, each processor may add the respective adjustment value, i.e., the respective partial sum $c_1(ip)$, to each of the elements of that processor's local buffer b, i.e., every processor performs the operation $b_0(i)=b_0(i)+c_1$, i=0, ..., N/(2P)-1.

Said another way, the sequence of values in each processor's local buffer b may each be adjusted by that processor's adjustment value, generating an adjusted sequence of values. Thus, the cumulative last partial sum for each processor may comprise an adjustment value which is added to each element in the local buffer b.

Finally, in 448, each processor may generate a respective local resultant vector from the adjusted sequence of values in that processor's local buffer b, and the imaginary values of the processor's local vector a. In one embodiment, this operation may be performed by each processor negating and shifting by one its odd-indexed local elements 1 (it copies them into its previous even-indexed elements):

$a(i)=-a(i+1)$, i=0, 2, 4, ..., nb-1 i.e., the imaginary terms are multiplied by -1, and moved into the respective previous slots of the buffer, thereby overwriting the original real values of the vector a. Each processor may then copy $n_b/2$ elements of $b_0$ into the local odd elements a(i), i=1, 3, 5, ..., $n_b$-1, i.e., the calculated real values of the buffer $b_0$ replace the original real terms of the vector a, producing a final result vector v, which is the Discrete Sine Transform of the input signal or vector x. Due to the overwrite, the buffer/vector a now contains the result vector v.

Said another way, each local vector may reside in a respective local buffer of the corresponding memory medium. The real values and imaginary values are generated by the FFT so as to occupy alternating positions in the respective local buffer, where the alternating positions comprise a first set of positions interleaved with a second set of positions. The respective local resultant vector may be generated from the imaginary values of said corresponding local vector and the respective adjusted sequence by shifting the imaginary values of the respective local buffer so as to move the real values (for the imaginary terms) in the respective local buffer from the first set of positions to the second set of positions, and storing the adjusted sequence of partial sums in the respective local buffer so as to overwrite the first set of positions.

Summarizing the post-process described above, 1) each of the P processors may compute a respective sequence of partial sums of the real values from the corresponding local vector; 2) the P processors may then perform a scan add of the last partial sum of each of the computed sequences to produce a respective adjustment value for each said sequence; 3) each of the P processors may then add the respective adjustment value to each partial sum of the respective sequence to generate a respective adjusted sequence of partial sums; and 4) each of the P processors may generate a respective local resultant vector from the imaginary values of the corresponding local vector and the respective adjusted sequence of partial sums, where the resultant vector v comprises the local resultant vectors.

Thus, the method described above with reference to FIGS. 4A–C receives an input signal x, performs a preprocess in parallel which modifies x to generate vector y, such that an FFT may be performed on y in parallel. The FFT is performed in parallel on y to produce vector a. Then a post-process is performed in parallel on the vector a to produce vector v, the Discrete Sine Transform of the input vector x.

Discrete Cosine Transform:

The Discrete Cosine Transform (DCT) expands a sequence of real numbers into component cosine functions. For a real (single or double precision) sequence $x_k$; k=0, ..., N-1 of even length, the forward DCT is defined as:

$$X_k = c_k \sum_{j=0}^{N-1} x_j \cos((p(2j+1)k)/2N), k = 0, ..., N-1 \qquad (4)$$

where $c=1/\sqrt{2}$, and $c_k=\frac{1}{2}$, k=1, ..., N-1.
Similarly, the inverse DCT is defined as:

$$x_k = \sum_{j=0}^{N-1} c_j X_j \cos(\pi(2k+1)j/2N), k = 0, ..., N-1 \qquad (5)$$

where $c_0=(2\sqrt{2})/N$, and $c_j=4/N$, j=1, ..., N-1.

The parallel 1D DCT computation is based on the parallel 1D real-to-complex FFT computation. The DCT can be obtained via the real-to-complex FFT by suitable pre- and post-processing. A method to efficiently perform this pre- and post-processing in parallel is described below with reference to FIGS. 6A–C.

Figure 6A:
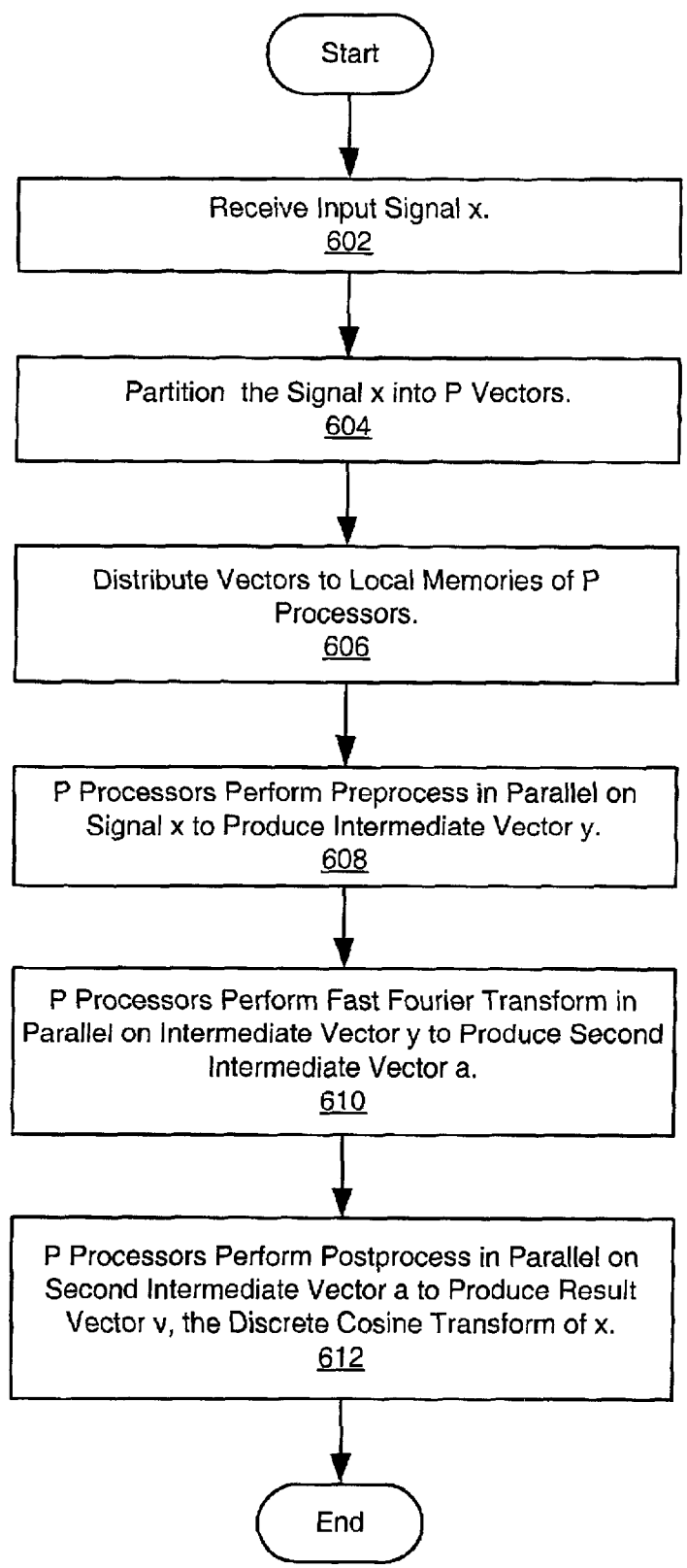
FIG. 6A is a flowchart of one embodiment of a method for parallel computation of a Discrete Cosine Transform.

FIG. 6A—Flowchart of Parallel Discrete Cosine Transform

FIG. 6A is a flowchart of a method for parallel computation of the Discrete Cosine Transform. In one embodiment, the method is performed on a parallel computation system comprising P processors and P corresponding local memories, as described above with reference to FIG. 3. It should be noted that in various embodiments, one or more of the following steps may be performed in a different order than shown, or omitted.

As FIG. 6A shows, in 602, an input signal x may be received. In one embodiment, the input signal x comprises N elements, where N is divisible by $4P^2$.

In 604, the signal x may be partitioned into local vectors, and in 606, distributed to the local memories of the P processors. In one embodiment, each local vector comprises N/P elements.

In 608, the P processors may perform a preprocess in parallel on the distributed signal x to generate an intermediate vector y. In one embodiment, the P processors may perform the preprocess on the signal x to prepare the data for application of a Fast Fourier Transform (FFT). Further details of the preprocess are provided below with reference to FIG. 6B.

In 610, the P processors may perform a Fast Fourier Transform in parallel on the intermediate vector y to produce a second intermediate vector a. In one embodiment, the second intermediate vector a may comprise alternating real and imaginary components.

In 612, the P processors may perform a post-process in parallel on the second intermediate vector a to produce a result vector v, which is the Discrete Cosine Transform of the signal x. Further details of the post-process are described below with reference to FIG. 6C.

Figure 6B:
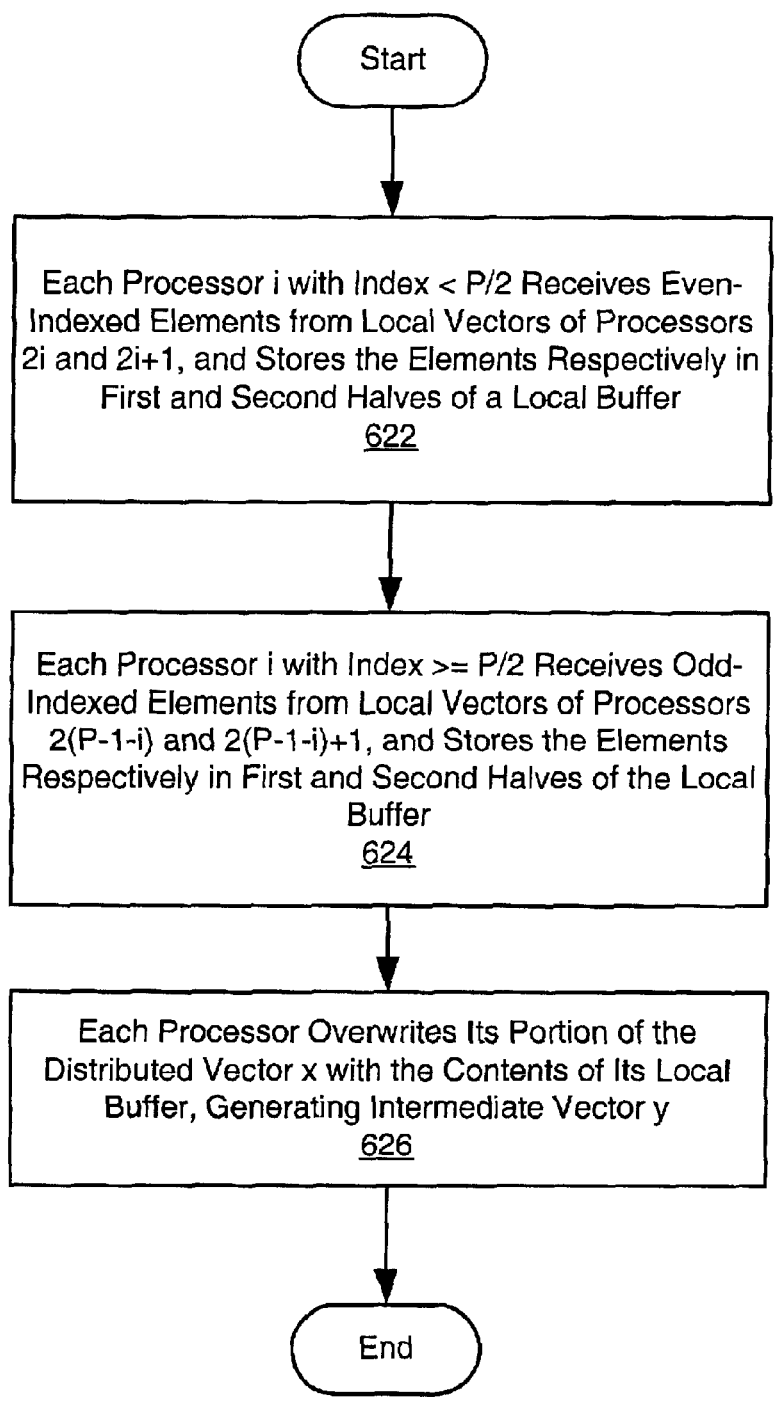
FIG. 6B is a flowchart of one embodiment of a preprocess in the method of FIG. 6A.

FIG. 6B—Flowchart of the Discrete Cosine Transform Preprocess

FIG. 6B is a flowchart of one embodiment of the preprocess of 608 above. As mentioned above, the preprocess operates on the received input signal x to produce the first intermediate vector y, described below.

In one embodiment, every processor may determine the global indices of the local part of the input vector x that it owns: For example, each processor $i_p$ has in its local memory N/P elements, indexed (locally) from 0 to N/P–1, corresponding to a contiguous part of the distributed vector x, whose (global) indices range from $i_p$ (N/P) to $(i_p+1)(N/P)-1$.

As FIG. 6B shows, in 622, each processor $i_p$ of the P processors with $i_p<P/2$ may receive even-indexed elements of the local vectors of corresponding mirror processors $2i_p$ and $2i_p+1$, and store the ordered elements in first and second halves respectively of a local buffer b of the processor $i_p$. In one embodiment, each processor $i_p$ may first determine the number of elements it owns whose global index is even and copy the even elements to a respective local buffer $b_{even}$. In this way, when the mirror processors send their respective even elements to the processor $i_p$, they simply send the contents of their respective local buffers $b_{even}$.

In 624, each processor $i_p$ of the P processors with $i_p>=P/2$ may receive odd-indexed elements of the local vectors of corresponding mirror processors $2(P-1-i_p)$ and $2(P-1-i_p)+1$, and store the ordered elements in first and second halves respectively of the local buffer b of the processor $i_p$. In one embodiment, each processor $i_p$ may first determine the number of elements it owns whose global index is odd and copy the odd elements to a respective local buffer be. In this way, when the mirror processors send their respective odd elements to the processor $i_p$, they simply send the contents of their respective local buffers $b_{odd}$.

Thus, the operations described above in 622 and 624 perform an even/odd shuffling operation on the local vectors of the P processors. For example, assume the input vector x is of length N=8. The input vector would be: $x=[x_0\ x_1\ x_2\ x_3\ x_4\ x_5\ x_6\ x_7]$. If the vector is distributed among P=4 processors, each processor holds in its local memory a sub-vector of the input vector (also referred to as the global vector, meaning the entire distributed vector), with local length N/P=2, i.e., processor $P_0$ will hold elements $[x_0\ x_1]$, processor $P_1$ $[x_2\ x_3]$, etc. The objective of this operation is to shuffle the elements of the input vector x, generating a new vector y, such that the first N/2 elements of y are the even-indexed elements of x, and the last N/2 elements of y are the odd-indexed elements of x, but in reversed order, i.e., in the example presented above (N=8), the global vector y would look like:

$$y=[x_0 x_2 x_4 x_6 x_7 x_5 x_3 x_1]$$

As FIG. 6B indicates, in 626, each processor may overwrite its local vector $x_{ip}$ with the contents of its local buffer b, to produce respective first resultant vectors $y_{ip}$.

Thus, the preprocess performs an even/odd shuffling operation on the input vector x to generate intermediate vector y, where the calculated first resultant vectors $y_{ip}$ together form the first intermediate vector y.

Figure 6C:
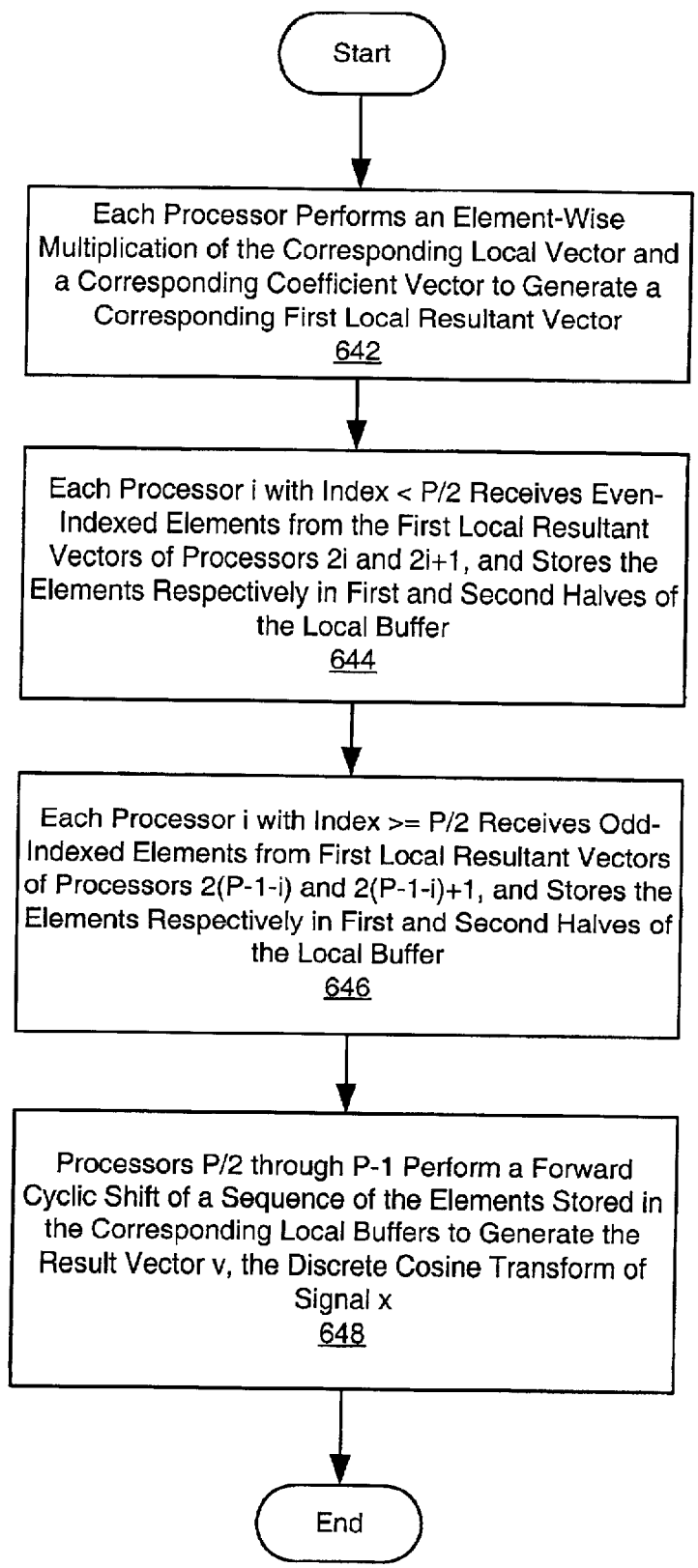
FIG. 6C is a flowchart of one embodiment of a post-process in the method of FIG. 6A.

FIG. 6C—Flowchart of the Discrete Cosine Transform Post-process

After the computation of the parallel real-to-complex FFT (610 above), post-processing may be required to compute the DCT, as indicated in 612 above. FIG. 6C is a flowchart of this post-processing operation. In one embodiment, the second intermediate vector a resulting from the FFT may have a particular format. For example, in one embodiment, the vector a may comprise successive pairs of imaginary and real values, where each pair comprises a complex number. Such a format is assumed for illustration purposes in the following description of the Discrete Sine Transform Post-process. It should also be noted that the term "local vector" now refers to the distributed portions of the intermediate a, resulting from the FFT performed above in 612.

In one embodiment, a set of coefficients, or twiddle factors, $w_1$ (subscript 1 denotes local), used in computing the transform, may be calculated. The coefficients $w_1$ form a global vector w, which is distributed among the P processors, where each processor has a local coefficient vector $w_1$ of length N/P. The elements of the vector w may be initialized as follows:

Processor 0 computes its local coefficient vector as:

$w_1(0)=1/\sqrt{N}$ $w_1(1)=\cos((p/(2N))\cdot(N/2))\cdot(2/\sqrt{2N})$ for k=2, 4, 6 . . . , N/P–2:

$w_1(k)=\cos((p/(2N))\cdot(k/2))\cdot(2/\sqrt{2N})$ $w_1(k+1)=-\sin((p/(2N))\cdot(k/2))\cdot(2/\sqrt{2N})$ Each processor indexed by $i_p$, where $i_p=1, 2, \ldots, P-1$, computes its local coefficient sub-vector as:
for k=0, 2, 4, 6 . . . , N/P–2

$w_1(k)=\cos((p/(2N))\cdot(i_pN/(2P)+(k/2)))\cdot(2/\sqrt{2N})$ $w_1(k+1)=-\sin((p/(2N))\cdot(i_pN/(2P)+(k/2)))\cdot(2\sqrt{2N})$ In one embodiment, the respective coefficient vectors of the P processors may be calculated before the input signal x is received. In another embodiment, the coefficient vectors may be calculated just prior to, or during the post-process.

As FIG. 6C shows, in 642, each processor may perform an element-wise multiplication of the corresponding local vector and the corresponding local coefficient vector to generate a corresponding first local resultant vector. Each processor multiplies the local result of the real-to-complex FFT with the local coefficient vector: Processor 0 multiplies point-wise the first two elements of the result vector with the first two elements of the twiddle factor vector. The remaining N/P–2 elements of the result and twiddle local vectors are treated as N/(2P)–1 complex numbers and multiplied point-wise, Each processor whose index is larger than 0 treats the local parts of the result and coefficient vectors as N/(2P) complex numbers and multiplies them point-wise via complex multiplications.

In 644, each processor $i_p$ of the P processors with $i_p<P/2$ may receive even-indexed elements of the first local resultant vectors of corresponding mirror processors $2i_p$ and $2i_p+1$, and store the ordered elements in first and second halves respectively of the local buffer b of the processor $i_p$. In one embodiment, each processor $i_p$ may first determine the number of elements it owns whose global index is even and copy the even elements to the respective local buffer $b_{odd}$. In this way, when the mirror processors send their respective even elements to the processor $i_p$, they simply send the contents of their respective local buffers $b_{even}$.

In 646, each processor $i_p$ of the P processors with i>=P/2 may receive odd-indexed elements of the local vectors of corresponding mirror processors 2(P−1−i) and 2(P−1−i)+1, and store the ordered elements in first and second halves respectively of the local buffer b of the processor $i_p$. In one embodiment, each processor $i_p$ may first determine the number of elements it owns whose global index is odd and copy the odd elements to the respective local buffer $b_{odd}$. In this way, when the mirror processors send their respective odd elements to the processor $i_p$, they simply send the contents of their respective local buffers $b_{odd}$.

Thus, the operations described in 644 and 646 above together perform an even/odd shuffling operation on the elements of the first local resultant vectors of the P processors to generate respective second resultant vectors, similar to that described above in 622 and 624 of FIG. 6B.

In one embodiment, after the even/odd shuffling operation, each processor may overwrite the contents of its local vector a with the contents of its local buffer b.

Finally, in 648, a subset of the processors, e.g., processors P/2 through P−1 (the "top" half of the processors) may perform a forward cyclic shift of elements stored in their collective local buffers b, i.e., the elements of the second resultant vectors corresponding to the subset of processors. After this operation, the contents of the respective local buffers b of the P processors collectively form the result vector v, which is the Discrete Cosine Transform of the input signal x. In one embodiment, each processor may overwrite the corresponding local vector a with contents of the corresponding local buffer b.

In the case that the local vectors a have been overwritten by the contents of the local buffers b, the cyclic shift may be performed on the elements of their respective local vectors a, and so the contents of the respective local vectors a of the P processors collectively form the result vector v, which is the Discrete Cosine Transform of the input signal x.

Said another way, processors whose index is greater than or equal to P/2 may execute the following operations (assuming that the local vectors have been overwritten by the contents of the respective local buffers b):

1. The processor whose index is P−1 sends the last element of its local part of the vector to the processor with index P/2. All local elements indexed (locally) from 0 to N/P−2 are shifted by one position up, so that their new local indices become 1 to N/P−1. The position of the first element (with local index 0) is filled by an element received from processor with index P−2.
2. Processors whose processor number $i_p$ ranges from P/2+1 to P−2 each perform the following steps: Send the last local element to processor $i_p$+1, shift all the local elements indexed from 0 to N/P−2 to positions 1 to N/P−1, and receive the first element from the processor with index $i_p$−1.
3. The processor whose index is P/2 sends its last element to the processor with index P/2+1, shifts all its local elements indexed from 0 to N/P−2 to positions 1 to N/P−1, and receives the first element from processor with index P−1.

Thus, the method described above receives an input signal x, performs a preprocess in parallel which modifies x to generate vector y, such that an FFT may be performed on y in parallel. The FFT is performed in parallel on y to produce vector a. Then a post-process is performed in parallel on the vector a to produce vector v, the Discrete Cosine Transform of the input vector x.

Memory and Carrier Medium

As mentioned above, the computing system preferably includes a plurality of memory mediums on which software according to an embodiment of the present invention may be stored. The memory mediums may store the input signal x, the final transformed result v, as well as various intermediate result vectors computed in the process. The memory mediums may also store a software program (or a plurality of software programs) for executing the methods described above with reference to FIGS. 4A–C, FIGS. 5A–B and 6A–C. One or more of the memory mediums may further store one or more software programs for analyzing the input signal x and the final result vector v.

The term "memory medium" is intended to include an installation medium, e.g., a CD-ROM, floppy disks, or tape device; a computer system memory or random access memory (RAM) such as DRAM, SRAM, EDO RAM, RRAM, etc.; or a non-volatile memory such as a magnetic media, e.g., a hard drive, or optical storage. The memory medium may comprise other types of memory as well, or combinations thereof.

In addition, the memory mediums may be located in one or more first computers in which the one or more software programs are stored or executed, and/or may be located in one or more second different computers which connect to the first computers over a network, such as the Internet. In the latter instance, the second computers provide the program instructions to the first computers for execution. The memory mediums thus may be distributed across a plurality of computers 102.

Various embodiments further include receiving or storing instructions and/or data implemented in accordance with the foregoing description upon a carrier medium. Suitable carrier media include a memory medium as described above, as well as signals such as electrical, electromagnetic, or digital signals, conveyed via a communication medium such as networks and/or a wireless link.

In one embodiment, the software programs as described herein may be designed for use in telecommunication systems, including systems which perform filtering, analysis, and/or display, or for use in various cryptographic systems. In another embodiment, the software programs may be designed for use in imaging systems. In other embodiments, the software programs may be designed for use in business, financial, scientific, biometric, or medical analysis, among others.

However, it is noted that the present invention can be used for a plethora of applications and is not limited to the applications shown herein. In other words, the applications described herein are exemplary only, and the methods described herein may be used for any of various purposes and may be stored in and execute on any of various types of systems to perform any of various applications.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for performing parallel computation of a Discrete Transform of an input signal x, wherein the method operates in a system comprising P interconnected processors and corresponding P memory mediums, wherein P is an integer greater than one, the method comprising:

receiving the input signal x, wherein the input signal x comprises N elements, wherein N is evenly divisible by $4*P^2$;

the P interconnected processors executing a preprocess in parallel on the signal x to produce a first intermediate vector y;

the P interconnected processors executing a real-to-complex Fourier Transform on said first intermediate vector y to produce a second intermediate vector a; and the P interconnected processors executing a post-process in parallel on the second intermediate vector a to produce a result vector v, wherein the result vector v comprises the Discrete Transform of the input signal x;

wherein the Discrete Transform of the signal x is useable in analyzing the signal x.

2. The method of claim 1, further comprising:

storing the Discrete Transform of the signal x after said executing the post-process.

3. The method of claim 1, further comprising:

partitioning the signal x into P ordered local vectors; and distributing one of the P ordered local vectors respectively to each of the P memory mediums before said executing the preprocess.

4. The method of claim 3, wherein the Discrete Transform is a Discrete Sine Transform; and wherein said executing a preprocess in parallel on the signal x to produce a first intermediate vector y comprises:
  a first processor of said P processors receiving a first sub-vector of the local vector of a first mirror processor of said P processors;
  the first processor receiving a first element of the local vector of a second mirror processor of said P processors; and
  the first processor computing a first resultant local vector from the local vector of the first processor, said first sub-vector, and said first element.

5. The method of claim 4, wherein said computing the first resultant local vector comprises:

computing a resultant sub-vector from a sub-vector of the local vector of the first processor and the first sub-vector; and computing a resultant element from a first element of the local vector of the first processor and said first element;

wherein said first resultant local vector comprises said resultant sub-vector and said resultant element.

6. The method of claim 5, wherein said first resultant local vector comprises an ordered sequence of vector elements comprising an initial element and a sequence of subsequent elements;

wherein said resultant element comprises said initial element of said ordered sequence of vector elements; and wherein said resultant sub-vector comprises said sequence of subsequent elements.

7. The method of claim 4, wherein the first processor is the $i^{th}$ processor of said P processors, and the first mirror processor is the $(P-1-i)^{th}$ processor of said P processors.

8. The method of claim 4, wherein the second mirror processor is the $(P-i)^{th}$ processor of said P processors.

9. The method of claim 4 further comprising:

said first mirror processor receiving a first sub-vector of the local vector of the first processor;

said first mirror processor receiving a first element of the local vector of a second processor; and said first mirror processor computing a second resultant local vector from the local vector of the first processor, said first sub-vector and said first element.

10. The method of claim 4, further comprising:

each processor of said P processors computing a respective set of coefficients;

wherein said computing a first resultant local vector comprises computing a plurality of resultant values, wherein each of said plurality of resultant values is computed by:
  generating a sum and a difference of a respective element of the local vector of the first processor and a complementary element of the first sub-vector;
  multiplying the sum by a corresponding one of said coefficients to generate a first product;
  multiplying the difference by a constant value to generate a second product; and
  adding the first product and second product to generate the resultant value.

11. The method of claim 3, wherein the Discrete Transform is a Discrete Sine Transform;

wherein said first processor is an initial processor of said P processors;

wherein said executing a preprocess in parallel on the signal x to produce a first intermediate vector y comprises:
  a first processor of said P processors receiving a first sub-vector of the local vector of a first mirror processor of said P processors; and
  the first processor of said P processors computing a first resultant local vector from a sub-vector of the local vector of the first processor, said first sub-vector and a first element having a value of zero.

12. The method of claim 3, wherein said Discrete Transform is a Discrete Cosine Transform;

wherein said executing a preprocess in parallel on the signal x to produce a first intermediate vector y comprises:

each processor $i_p$ of said P processors with index less than P/2 receiving even-indexed elements from the respective local vectors of processor $2i_p$ and processor $2i_p+1$, and storing said even-indexed elements in first and second halves respectively of a second local buffer corresponding to processor $i_p$; and each processor $i_p$ of said P processors with index greater than or equal to P/2 receiving odd-indexed elements from processor $2(P-1-i_p)$ and processor $2(P-1-i_p)+1$, and storing said odd-indexed elements in first and second halves respectively of the second local buffer corresponding to processor $i_p$;

wherein a union of respective contents of said second buffers comprises said intermediate vector y.

13. The method of claim 12 further comprising:

each processor of said P processors overwriting the corresponding local vector with contents of said corresponding second buffer.

14. The method of claim 1, wherein the Discrete Transform is a Discrete Sine Transform;

wherein said second intermediate vector a comprises P local vectors corresponding respectively to said P processors, wherein each said local vector comprises real values and imaginary values;

wherein said executing a post-process in parallel on the second intermediate vector a to produce the resultant vector v comprises:

each of said P processors computing a respective sequence of partial sums of the real values from the corresponding local vector;

said P processors performing a scan add of the last partial sum of each of said sequences to produce a respective adjustment value for each said sequence;

each of said P processors adding the respective adjustment value to each partial sum of said respective sequence to generate a respective adjusted sequence of partial sums; and each of said P processors generating a respective local resultant vector from said imaginary values of said corresponding local vector and said respective adjusted sequence of partial sums;

wherein said resultant vector v comprises said local resultant vectors.

15. The method of claim 14, wherein each said local vector resides in a respective local buffer of the corresponding memory medium, wherein said real values and imaginary values are generated by said FFT so as to occupy alternating positions in said respective local buffer wherein said alternating positions comprise a first set of positions interleaved with a second set of positions;

wherein said generating the respective local resultant vector from said imaginary values of said corresponding local vector and said respective adjusted sequence comprises:

shifting the imaginary values of said respective local buffer so as to move the real values in said respective local buffer from the first set of positions to the second set of positions; and storing the adjusted sequence of partial sums in said respective local buffer so as to overwrite the first set of positions.

16. The method of claim 1, wherein said Discrete Transform is a Discrete Cosine Transform;

wherein said second intermediate vector a comprises P local vectors corresponding respectively to said P processors, wherein each of said P local vectors represents a set of complex numbers;

wherein said executing a post-process in parallel on the second intermediate vector a to produce the resultant vector v comprises:

each processor $i_p$ performing an element-wise multiplication of the corresponding local vector and a corresponding coefficient vector to generate a corresponding first local resultant vector; and said P processors performing an even/odd shuffling operation on said corresponding first local resultant vectors to generate corresponding second local resultant vectors.

17. The method of claim 16, wherein said second local resultant vectors corresponding to a subset of said P processors comprise a sequence of elements, wherein said executing a post-process in parallel on the second intermediate vector a to produce the resultant vector v further comprises:

said subset of said P processors performing a forward cyclic shift on said sequence of elements to generate the result vector v.

18. The method of claim 17, wherein said subset of said P processors comprises processors with indices greater than or equal to P/2.

19. The method of claim 16, wherein said performing an even/odd shuffling operation on said corresponding first local resultant vectors to generate corresponding second local resultant vectors comprises:

each processor $i_p$ of said P processors with index less than P/2 receiving even-indexed elements from the respective first local resultant vectors of processor $2i_p$ and processor $2i_p+1$, and storing said even-indexed elements in first and second halves respectively of the second local buffer corresponding to processor $i_p$; and each processor $i_p$ of said P processors with index greater than or equal to P/2 receiving odd-indexed elements from the respective first local resultant vectors of processor $2(P-1-i_p)$ and processor $2(P-1-i_p)+1$, and storing said odd-indexed elements in first and second halves respectively of the second local buffer corresponding to processor $i_p$;

wherein the respective contents of said second buffers comprise said corresponding second local resultant vectors.

20. The method of claim 19, further comprising:

each processor of said P processors overwriting the corresponding local vector with contents of said corresponding second buffer.

21. A system for performing parallel computation of a Discrete Transform of an input signal x, the system comprising:

P interconnected processors, wherein P is an integer greater than one;

P memory mediums, wherein each of the memory mediums is coupled to a corresponding one of the P interconnected processors; and an input for receiving the signal x, wherein the signal x comprises N elements, wherein N is evenly divisible by $4*P^2$;

wherein the P interconnected processors are operable to:

execute a preprocess in parallel on the signal x to produce a first intermediate vector;

execute a real-to-complex Fourier Transform on said first intermediate vector to produce a second intermediate vector, and execute a post-process in parallel on the second intermediate vector to produce a result vector, wherein the result vector comprises the Discrete Transform of the input signal x, wherein the Discrete Transform of the input signal x is useable in analyzing the input signal x.

22. The system of claim 21, wherein said P interconnected processors are further operable to:

store the Discrete Transform of the signal x after said executing the post-process.

23. The system of claim 21, wherein said P interconnected processors are further operable to:

partition the signal x into P ordered local vectors; and distribute one of the P ordered local vectors respectively to each of the P memory mediums before said executing the preprocess.

24. The system of claim 23, wherein the Discrete Transform is a Discrete Sine Transform; and wherein in said executing a preprocess in parallel on the signal x to produce a first intermediate vector y, a first processor of said P processors is operable to:

receive a first sub-vector of the local vector of a first mirror processor of said P processors;

receive a first element of the local vector of a second mirror processor of said P processors; and compute a first resultant local vector from the local vector of the first processor, said first sub-vector, and said first element.

25. The system of claim 24, wherein in said computing the first resultant local vector, said first processor of said P processors is operable to:
   compute a resultant sub-vector from a sub-vector of the local vector of the first processor and the first sub-vector; and
   compute a resultant element from a first element of the local vector of the first processor and said first element;
   wherein said first resultant local vector comprises said resultant sub-vector and said resultant element.

26. The system of claim 25,
   wherein said first resultant local vector comprises an ordered sequence of vector elements comprising an initial element and a sequence of subsequent elements;
   wherein said resultant element comprises said initial element of said ordered sequence of vector elements; and
   wherein said resultant sub-vector comprises said sequence of subsequent elements.

27. The system of claim 24, wherein the first processor is the $i^{th}$ processor of said P processors, and the first mirror processor is the $(P-1-i)^{th}$ processor of said P processors.

28. The system of claim 24, wherein the second mirror processor is the $(P-i)^{th}$ processor of said P processors.

29. The system of claim 24, wherein said first mirror processor is operable to:
   receive a first sub-vector of the local vector of the first processor;
   receive a first element of the local vector of a second processor; and
   compute a second resultant local vector from the local vector of the first processor, said first sub-vector and said first element.

30. The system of claim 24, wherein each processor of said P processors is operable to compute a respective set of coefficients;
   wherein in said computing a first resultant local vector, said first processor is operable to compute a plurality of resultant values, wherein said first processor is operable to compute each said resultant value by:
      generating a sum and a difference of a respective element of the local vector of the first processor and a complementary element of the first sub-vector;
      multiplying the sum by a corresponding one of said coefficients to generate a first product;
      multiplying the difference by a constant value to generate a second product; and
      adding the first product and second product to generate the resultant value.

31. The system of claim 23,
   wherein the Discrete Transform is a Discrete Sine Transform;
   wherein said first processor is an initial processor of said P processors;
   wherein in said executing a preprocess in parallel on the signal x to produce a first intermediate vector y, a first processor of said P processors is operable to:
      receive a first sub-vector of the local vector of a first mirror processor of said P processors; and
      compute a first resultant local vector from a sub-vector of the local vector of the first processor, said first sub-vector and a first element having a value of zero.

32. The system of claim 31,
   wherein said Discrete Transform is a Discrete Cosine Transform;
   wherein in said executing a preprocess in parallel on the signal x to produce a first intermediate vector y:
      each processor $i_p$ of said P processors with index less than P/2 is operable to receive even-indexed elements from the respective local vectors of processor $2i_p$ and processor $2i_p+1$, and store said even-indexed elements in a second buffer corresponding to processor $i_p$; and
      each processor $i_p$ of said P processors with index greater than or equal to P/2 is operable to receive odd-indexed elements from processor $2(P-1-i_p)$ and processor $2(P-1-i_p)+1$, and store said odd-indexed elements in the second buffer corresponding to processor $i_p$;
   wherein a union of respective contents of said second buffers comprises said intermediate vector y.

33. The system of claim 32 further comprising:
   each processor of said P processors overwriting the corresponding local vector with contents of said corresponding second buffer.

34. The system of claim 21, wherein the Discrete Transform is a Discrete Sine Transform;
   wherein said second intermediate vector comprises P local vectors corresponding respectively to said P processors, wherein each said local vector comprises real values and imaginary values;
   wherein in said executing a post-process in parallel on the second intermediate vector a to produce the resultant vector v:
      each of said P processors is operable to compute a respective sequence of partial sums of the real values from the corresponding local vector;
      said P processors are operable to perform a scan add of the last partial sum of each of said sequences to produce a respective adjustment value for each said sequence;
      each of said P processors is operable to add the respective adjustment value to each partial sum of said respective sequence to generate a respective adjusted sequence of partial sums; and
      each of said P processors is operable to generate a respective local resultant vector from said imaginary values of said corresponding local vector and said respective adjusted sequence of partial sums;
   wherein said resultant vector v comprises said local resultant vectors.

35. The system of claim 34, wherein each said local vector resides in a respective local buffer of the corresponding memory medium, wherein said real values and imaginary values are generated by said FFT so as to occupy alternating positions in said respective local buffer wherein said alternating positions comprise a first set of positions interleaved with a second set of positions;
   wherein said generating the respective local resultant vector from said imaginary values of said corresponding local vector and said respective adjusted sequence comprises:
      shifting the imaginary values of said respective local buffer so as to move the real values in said respective local buffer from the first set of positions to the second set of positions; and
      storing the adjusted sequence of partial sums in said respective local buffer so as to overwrite the first set of positions.

36. The system of claim 21,
wherein said Discrete Transform is a Discrete Cosine Transform;
wherein said second intermediate vector comprises P local vectors corresponding respectively to said P processors, wherein each of said P local vectors represents a set of complex numbers; and
wherein in said executing a post-process in parallel on the second intermediate vector a to produce the resultant vector v:
   each processor $i_p$ is operable to perform an element-wise multiplication of the corresponding local vector and a corresponding coefficient vector to generate a corresponding first local resultant vector; and
   said P processors are operable to perform an even/odd shuffling operation on said corresponding first local resultant vectors to generate corresponding second local resultant vectors.

37. The system of claim 36, wherein said second local resultant vectors corresponding to a subset of said P processors comprise a sequence of elements;
wherein in said executing a post-process in parallel on the second intermediate vector a to produce the resultant vector v:
   said subset of said P processors are operable to perform a forward cyclic shift on said sequence of elements to generate the result vector v.

38. The method of claim 37, wherein said subset of said P processors comprises processors with indices greater than or equal to P/2.

39. The system of claim 36, wherein in said performing an even/odd shuffling operation on said corresponding first local resultant vectors to generate corresponding second local resultant vectors:
   each processor $i_p$ of said P processors with index less than P/2 is operable to receive even-indexed elements from the respective first local resultant vectors of processor $2i_p$ and processor $2i_p+1$, and store said even-indexed elements in a second buffer corresponding to processor $i_p$; and
   each processor $i_p$ of said P processors with index greater than or equal to P/2 is operable to receive odd-indexed elements from the respective first local resultant vectors of processor $2(P-1-i_p)$ and processor $2(P-1-i_p)+1$, and store said odd-indexed elements in the second buffer corresponding to processor $i_p$;
wherein the respective contents of said second buffers comprise said corresponding second local resultant vectors.

40. The system of claim 39, wherein each processor of said P processors is operable to overwrite the corresponding local vector with contents of said corresponding second buffer.

41. A memory medium comprising program instructions for performing parallel computation of a Discrete Transform, wherein the memory medium is comprised in a system comprising a plurality of P interconnected processors, wherein P is an integer greater than one, wherein said program instructions are executable by the P interconnected processors to perform:
   receiving an input signal x, wherein the input signal x comprises N elements, wherein N is evenly divisible by $4*P^2$;
   executing a preprocess in parallel on the signal x to produce a first intermediate vector y;
   executing a real-to-complex Fourier Transform on said first intermediate vector y to produce a second intermediate vector, a; and
   executing a post-process in parallel on the second intermediate vector a to produce a result vector v, wherein the result vector v comprises the Discrete Transform of the input signal x;
wherein the Discrete Transform of the signal x is useable in analyzing the signal x.

42. The memory medium of claim 41, wherein said program instructions are further executable to perform:
   storing the Discrete Transform of the signal x after said executing the post-process.

43. The memory medium of claim 41, wherein the memory medium comprises P memory mediums corresponding respectively to the P processors, wherein said program instructions are further executable to perform:
   partitioning the signal x into P ordered local vectors; and
   distributing one of the P ordered local vectors respectively to each of the P memory mediums before said executing the preprocess.

44. The memory medium of claim 43,
wherein the Discrete Transform is a Discrete Sine Transform; and
wherein in said executing a preprocess in parallel on the signal x to produce a first intermediate vector y said program instructions are executable by a first processor of said P processors to perform:
   receiving a first sub-vector of the local vector of a first mirror processor of said P processors;
   receiving a first element of the local vector of a second mirror processor of said P processors; and
   computing a first resultant local vector from the local vector of the first processor, said first sub-vector, and said first element.

45. The memory medium of claim 44, wherein said computing the first resultant local vector comprises:
   computing a resultant sub-vector from a sub-vector of the local vector of the first processor and the first sub-vector; and
   computing a resultant element from a first element of the local vector of the first processor and said first element;
wherein said first resultant local vector comprises said resultant sub-vector and said resultant element.

46. The memory medium of claim 45,
wherein said first resultant local vector comprises an ordered sequence of vector elements comprising an initial element and a sequence of subsequent elements;
wherein said resultant element comprises said initial element of said ordered sequence of vector elements; and
wherein said resultant sub-vector comprises said sequence of subsequent elements.

47. The memory medium of claim 44, wherein the first processor is the $j^{th}$ processor of said P processors, and the first mirror processor is the $(P-1-j)^{th}$ processor of said P processors.

48. The memory medium of claim 44, wherein the second mirror processor is the $(P-j)^{th}$ processor of said P processors.

49. The memory medium of claim 44, wherein said program instructions are executable by said first mirror processor to perform:
   receiving a first sub-vector of the local vector of the first processor;
   receiving a first element of the local vector of a second processor; and
   computing a second resultant local vector from the local vector of the first processor, said first sub-vector and said first element.

50. The memory medium of claim 44, wherein said program instructions are executable by each processor of said P processors to perform:
  computing a respective set of coefficients;
  wherein said computing a first resultant local vector comprises computing a plurality of resultant values, and wherein each of said plurality of resultant values is computed by:
    generating a sum and a difference of a respective element of the local vector of the first processor and a complementary element of the first sub-vector;
    multiplying the sum by a corresponding one of said coefficients to generate a first product;
    multiplying the difference by a constant value to generate a second product; and
    adding the first product and second product to generate the resultant value.

51. The memory medium of claim 41,
  wherein the Discrete Transform is a Discrete Sine Transform;
  wherein said first processor is an initial processor of said P processors;
  wherein in said executing a preprocess in parallel on the signal x to produce a first intermediate vector y, the program instructions are executable by a first processor of said P processors to perform:
    receiving a first sub-vector of the local vector of a first mirror processor of said P processors; and
    computing a first resultant local vector from a sub-vector of the local vector of the first processor, said first sub-vector and a first element having a value of zero.

52. The memory medium of claim 41,
  wherein the Discrete Transform is a Discrete Sine Transform;
  wherein said second intermediate vector a comprises P local vectors corresponding respectively to said P processors, wherein each said local vector comprises real values and imaginary values;
  wherein in said executing a post-process in parallel on the second intermediate vector a to produce the resultant vector v, the program instructions are executable by each of said P processors to perform:
    computing a respective sequence of partial sums of the real values from the corresponding local vector;
  wherein in said executing a post-process in parallel on the second intermediate vector a to produce the resultant vector v, the program instructions are executable by said P processors to perform:
    performing a scan add of the last partial sum of each of said sequences to produce a respective adjustment value for each said sequence;
  wherein in said executing a post-process in parallel on the second intermediate vector a to produce the resultant vector v, the program instructions are further executable by each of said P processors to perform:
    adding the respective adjustment value to each partial sum of said respective sequence to generate a respective adjusted sequence of partial sums; and
    generating a respective local resultant vector from said imaginary values of said corresponding local vector and said respective adjusted sequence of partial sums;
  wherein said resultant vector v comprises said local resultant vectors.

53. The memory medium of claim 52, wherein each said local vector resides in a respective local buffer of the corresponding memory medium, wherein said real values and imaginary values are generated by said FFT so as to occupy alternating positions in said respective local buffer wherein said alternating positions comprise a first set of positions interleaved with a second set of positions;
  wherein said generating the respective local resultant vector from said imaginary values of said corresponding local vector and said respective adjusted sequence comprises:
    shifting the imaginary values of said respective local buffer so as to move the real values in said respective local buffer from the first set of positions to the second set of positions; and
    storing the adjusted sequence of partial sums in said respective local buffer so as to overwrite the first set of positions.

54. The memory medium of claim 41,
  wherein said Discrete Transform is a Discrete Cosine Transform;
  wherein in said executing a preprocess in parallel on the signal x to produce a first intermediate vector y:
    said program instructions are executable by each processor $i_p$ of said P processors with index less than P/2 to perform:
      receiving even-indexed elements from the respective local vectors of processor $2i_p$ and processor $2i_p+1$, and storing said even-indexed elements in a second buffer corresponding to processor $i_p$; and
    said program instructions are executable by each processor $i_p$ of said P processors with index greater than or equal to P/2 to perform:
      receiving odd-indexed elements from processor $2(P-1-i_p)$ and processor $2(P-1-i_p)+1$, and storing said odd-indexed elements in a second buffer corresponding to processor $i_p$;
  wherein a union of respective contents of said second buffers comprises said intermediate vector y.

55. The memory medium of claim 54 wherein said program instructions are further executable by each processor of said P processors to perform:
  overwriting the corresponding local vector with contents of said corresponding second buffer.

56. The memory medium of claim 41,
  wherein said Discrete Transform is a Discrete Cosine Transform;
  wherein said second intermediate vector a comprises P local vectors corresponding respectively to said P processors, wherein each of said P local vectors represents a set of complex numbers;
  wherein in said executing a post-process in parallel on the second intermediate vector a to produce the resultant vector v:
    said program instructions are executable by each processor $i_p$ to perform:
      performing an element-wise multiplication of the corresponding local vector and a corresponding coefficient vector to generate a corresponding first local resultant vector; and
    said program instructions are executable by said P processors to perform:
      performing an even/odd shuffling operation on said corresponding first local resultant vectors to generate corresponding second local resultant vectors.

57. The memory medium of claim 56, wherein said second local resultant vectors corresponding to a subset of said P processors comprise a sequence of elements, wherein in said executing a post-process in parallel on the second intermediate vector a to produce the resultant vector v, said program instructions are further executable by said subset of said P processors to perform:

performing a forward cyclic shift on said sequence of elements to generate the result vector v.

58. The memory medium of claim 57, wherein said subset of said P processors comprises processors with indices greater than or equal to P/2.

59. The memory medium of claim 56, wherein in said performing an even/odd shuffling operation on said corresponding first local resultant vectors to generate corresponding second local resultant vectors:

said program instructions are executable by each processor $i_p$ of said P processors with index less than P/2 to perform:

receiving even-indexed elements from the respective first local resultant vectors of processor $2i_p$ and processor $2i_p+1$, and storing said even-indexed elements in a second buffer corresponding to processor $i_p$; and said program instructions are executable by each processor $i_p$ of said P processors with index greater than or equal to P/2 to perform:

receiving odd-indexed elements from the respective first local resultant vectors of processor $2(P-1-i_p)$ and processor $2(P-1-i_p)+1$, and storing said odd-indexed elements in a second buffer corresponding to processor $i_p$;

wherein the respective contents of said second buffers comprise said corresponding second local resultant vectors.

60. The memory medium of claim 59, wherein said program instructions are ether executable by each processor of said P processors to perform:

overwriting the corresponding local vector with contents of said corresponding second buffer.

61. A method for performing parallel computation of a Discrete Sine Transform of an input signal x, wherein the method operates in a system comprising P interconnected processors and a corresponding P memory mediums, wherein P is an integer greater than one, the method comprising:

receiving an input signal x, wherein the input signal x comprises N elements, wherein N is evenly divisible by $4*P^2$;

the P interconnected processors executing a preprocess in parallel on the signal x to produce a first intermediate vector y;

the P interconnected processors executing a real-to-complex Fourier Transform on said first intermediate vector y to produce a second intermediate vector a; and the P interconnected processors executing a post-process in parallel on the second intermediate vector a to produce a result vector v, wherein the result vector v comprises the Discrete Transform of the input signal x;

wherein the Discrete Sine Transform of the signal x is useable in analyzing the signal x.

62. A method for performing parallel computation of a Discrete Cosine Transform of an input signal x, wherein the method operates in a system comprising P interconnected processors and corresponding P memory mediums, wherein P is an integer greater than one, the method comprising:

receiving an input signal x, wherein the input signal x comprises N elements, wherein N is evenly divisible by $4*P^2$;

the P interconnected processors executing a preprocess in parallel on the signal x to produce a first intermediate vector y;

the P interconnected processors executing a real-to-complex Fourier Transform on said first intermediate vector y to produce a second intermediate vector a; and the P interconnected processors executing a post-process in parallel on the second intermediate vector a to produce a result vector v, wherein the result vector v comprises the Discrete Transform of the input signal x;

wherein the Discrete Cosine Transform of the signal x is useable in analyzing the signal x.

* * * * *

UNITED STATES PATENT AND TRADEMARK OFFICE
CERTIFICATE OF CORRECTION

PATENT NO. : 6,839,727 B2
DATED : January 4, 2005
INVENTOR(S) : Kechriotis

It is certified that error appears in the above-identified patent and that said Letters Patent is hereby corrected as shown below:

Column 23,
Line 55, please delete "comprising a plurality of P" and substitute -- comprising P --.

Column 27,
Line 35, please delete "ether" and substitute -- further --.

Signed and Sealed this

Twelfth Day of April, 2005

JON W. DUDAS
*Director of the United States Patent and Trademark Office*